(12) United States Patent
Murata

(10) Patent No.: US 9,813,573 B2
(45) Date of Patent: Nov. 7, 2017

(54) READING DEVICE, IMAGE FORMING APPARATUS, AND READING DEVICE CONTROL METHOD

(71) Applicant: KYOCERA Document Solutions Inc., Osaka (JP)

(72) Inventor: Takuro Murata, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/268,196

(22) Filed: Sep. 16, 2016

(65) Prior Publication Data

US 2017/0094088 A1    Mar. 30, 2017

(30) Foreign Application Priority Data

Sep. 28, 2015    (JP) ................. 2015-190099

(51) Int. Cl.
*H04N 1/04*    (2006.01)
*H04N 1/00*    (2006.01)

(52) U.S. Cl.
CPC ....... *H04N 1/00822* (2013.01); *H04N 1/0071* (2013.01); *H04N 1/00572* (2013.01); *H04N 1/00588* (2013.01); *H04N 1/00602* (2013.01); *H04N 1/00612* (2013.01); *H04N 1/00649* (2013.01); *H04N 1/00689* (2013.01); *H04N 2201/0094* (2013.01)

(58) Field of Classification Search
CPC ........... H04N 1/00822; H04N 1/00572; H04N 1/00588; H04N 1/00602; H04N 1/00612; H04N 1/00649; H04N 1/00689; H04N 1/0071; H04N 2201/0094
USPC ................. 358/498, 496, 488, 486
See application file for complete search history.

(56) References Cited

U.S. PATENT DOCUMENTS

| | | | | |
|---|---|---|---|---|
| 5,991,592 | A * | 11/1999 | Kobayashi | G03G 15/23 271/3.14 |
| 6,118,972 | A * | 9/2000 | Yamazaki | G03G 15/607 399/370 |
| 6,161,831 | A * | 12/2000 | Kusakabe | B65H 9/006 271/186 |
| 6,209,861 | B1 * | 4/2001 | Kakuta | B65H 9/101 271/185 |
| 6,529,259 | B1 * | 3/2003 | Kono | G03G 15/23 271/3.13 |
| 7,336,404 | B2 * | 2/2008 | Benham | H04N 1/00681 271/117 |

(Continued)

FOREIGN PATENT DOCUMENTS

JP    2008-113353 A    5/2008

*Primary Examiner* — Cheukfan Lee
(74) *Attorney, Agent, or Firm* — Stein IP, LLC

(57) ABSTRACT

A reading device includes a conveyance control section for controlling document conveyance. In a case of double-sided reading of a document and with a cutout document mode applied, the conveyance control section stops a pair of reverse-rotation rollers at a time point when the document has been conveyed by a distance resulting from adding an additional distance, which is predetermined or determined based on a recognized cutout width in the document conveyance direction, to a reference distance since a time point of passage of a rear end of a document-detecting detection part, and thereafter start reverse rotation of the pair of reverse-rotation rollers.

9 Claims, 10 Drawing Sheets

(56) References Cited

U.S. PATENT DOCUMENTS

| | | | | |
|---|---|---|---|---|
| 2001/0016133 A1* | 8/2001 | Hirota | G03G 15/60 | 399/374 |
| 2001/0026380 A1* | 10/2001 | Imoto | H04N 1/00795 | 358/496 |
| 2002/0054382 A1* | 5/2002 | Nanno | H04N 1/00572 | 358/498 |
| 2002/0071702 A1* | 6/2002 | Nose | G03G 15/23 | 399/374 |
| 2004/0057079 A1* | 3/2004 | Ohsawa | G03G 15/602 | 358/2.1 |
| 2006/0044543 A1* | 3/2006 | Mizubata | G03B 29/00 | 355/407 |
| 2007/0003344 A1* | 1/2007 | Lee | G03G 15/602 | 399/374 |
| 2007/0115516 A1* | 5/2007 | Uku | H04N 1/00572 | 358/498 |
| 2008/0042344 A1* | 2/2008 | Song | H04N 1/00572 | 271/303 |
| 2008/0062477 A1* | 3/2008 | Jo | G03G 15/23 | 358/498 |
| 2008/0130071 A1* | 6/2008 | Katsuyama | H04N 1/00326 | 358/498 |
| 2008/0204828 A1* | 8/2008 | Akimoto | G03G 15/5012 | 358/498 |
| 2009/0086276 A1* | 4/2009 | Tanaka | H04N 1/00572 | 358/401 |
| 2009/0168093 A1* | 7/2009 | Kim | H04N 1/00572 | 358/1.15 |
| 2009/0219495 A1* | 9/2009 | Wang | G03B 27/52 | 355/24 |
| 2010/0097668 A1* | 4/2010 | Chung | H04N 1/00567 | 358/498 |
| 2010/0110502 A1* | 5/2010 | Chung | H04N 1/1215 | 358/474 |
| 2010/0134857 A1* | 6/2010 | Tsai | B65H 29/58 | 358/498 |
| 2010/0328737 A1* | 12/2010 | Shingai | B65H 3/063 | 358/498 |
| 2011/0102863 A1* | 5/2011 | Nakashima | G03G 15/04036 | 358/475 |
| 2011/0181926 A1* | 7/2011 | Tokutsu | H04N 1/00572 | 358/498 |
| 2011/0273752 A1* | 11/2011 | Suto | G03B 27/54 | 358/475 |
| 2011/0299144 A1* | 12/2011 | Yoshimoto | H04N 1/486 | 358/505 |
| 2012/0257231 A1* | 10/2012 | Akazawa | G03G 15/602 | 358/1.12 |
| 2012/0320435 A1* | 12/2012 | Horiuchi | G03G 15/043 | 358/475 |
| 2016/0366287 A1* | 12/2016 | Murata | H04N 1/00013 | |
| 2017/0060493 A1* | 3/2017 | Furukawa | G03G 15/234 | |

* cited by examiner (c)

DOCUMENT CONVEYANCE DIRECTION

REARMOST END

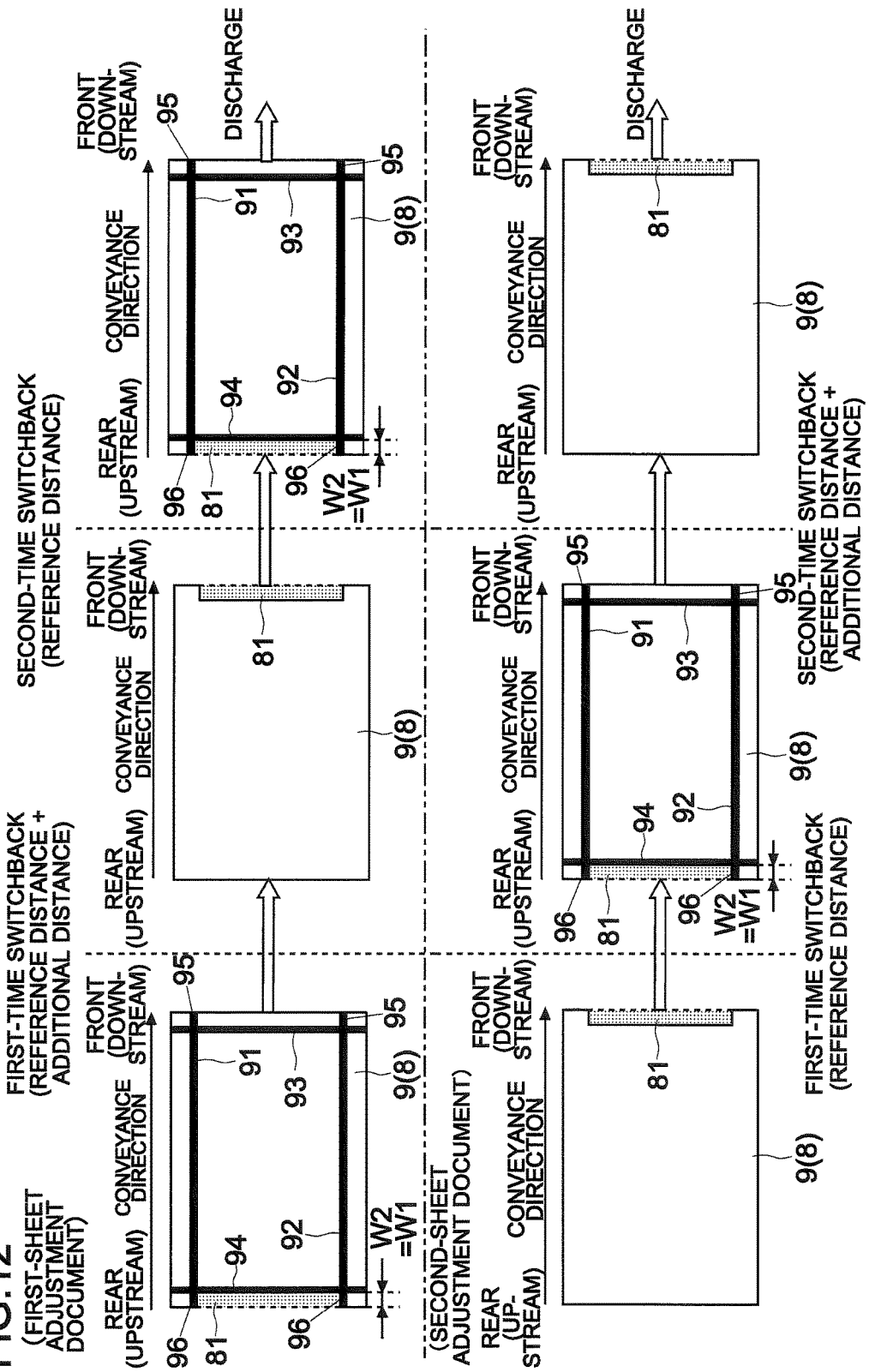

READING DEVICE, IMAGE FORMING APPARATUS, AND READING DEVICE CONTROL METHOD

This application is based upon and claims the benefit of priority from the corresponding Japanese Patent Application No. 2015-190099 filed on Sep. 28, 2015, the entire contents of which are incorporated herein by reference.

BACKGROUND

The present disclosure relates to a reading device, as well as an image forming apparatus, and a reading device control method for conveying and reading a document.

A reading device (scanner) for reading a document to acquire image data may be provided in image forming apparatuses such as multifunction peripherals, copiers, printers and FAX devices. In another case, a type of reading device in which sheets of a set document are automatically and continuously conveyed to a reading position so as to allow a plurality of document sheets to be read in short time may be installed in image forming apparatuses. A known example of such document reading devices is as follows.

More specifically, in a conventionally known document reading device, a document fed from a document tray capable of accommodating a plurality of document sheets is introduced into the device, the introduced document sheet then being automatically conveyed. With a first document detection sensor placed near a downstream side of a sheet feed roller, and with a second document detection sensor placed near a downstream side of a conveyance roller placed on a downstream side of the sheet feed roller, a conveyance state of the document is detected based on detection signals outputted from the first document detection sensor and the second document detection sensor, respectively.

Some reading devices are designed to perform switchback of a conveyed document to read both sides of the document. Such a reading device saves the user the trouble of further setting a bottom side of a document subsequent to reading of its top surface. In the reading device with this system, a document that has been passed through a reading position to have one side read over is switched back, and then the switched-back document is fed back to the upstream side of the reading position so as to be passed again through the reading position to allow the other side of the document to be read.

In the switchback operation, a switchback roller pairs conveys the document, which has passed through the reading position (which has one side read over), once in such a direction as to once discharge the document out of the apparatus. Before the document is released from a nip of the switchback roller pair (before the document is discharged out), the switchback roller pair is rotated reverse. The switchback roller pair feeds the document onto a return conveyance path connected to the upstream side of the reading position. Front and rear of the document are reversed by this switchback operation.

When the switchback operation is executed before a rear end of the document passes through a branch point between a conveyance path ranging from the reading position to the switchback rollers and the return conveyance path, the document is fed back toward the direction in which the document has been conveyed. Such backward feed may cause a break or paper jam of the document. In some cases, timing for the switchback rollers to stop rotation and start reverse rotation is determined based on an output of a sensor provided on the conveyance path. Rotational stop and reverse rotation (switchback) of the switchback rollers are executed at a time point when it can be predicted that the rear end of the document has passed through the branch point from the sensor's detection of passage of the rear end of the document (i.e., a time point when a certain time has elapsed since the time point of detection of the passage of the rear end).

In this connection, there are some cases where a document having part of its rear end is cut off (i.e., cutout document) is set on the reading device. For example, a user may cut off part of the document by processing with scissors or a cutter. In a case where the cutout portion and a detection area of the sensor overlap with each other, the sensor detects a passage of a document rear end before a passage of a rearmost end (a tail end, non-cut-off portion) of the document through an installation position (installation line) of the sensor. In other words, the sensor detects a rear-end passage at a time point earlier than the time point that should be detected by the sensor. For this reason, the switchback may be started before the rearmost end of the document completely passes through the branch point. As a result, there may occur reverse feed, damage or paper jam of the cutout document. Accordingly, there is an issue that the switchback should be executed so as to prevent the cutout document from occurrence of damage or paper jam.

The known technique described above is other than relating to cutout documents. Therefore, the above-described known technique cannot cope with the problem involved in switchback operation of cutout documents. The known technique employs two sensors. In reading of a cutout document, there may occur a state misdetection when the cutout portion passes through a detection area of one sensor and non-cutout portion of the document passes through a detection area of the other sensor.

SUMMARY

A reading device according to one aspect of the present disclosure includes: an operation panel, a reading unit, and a conveyance unit. The operation panel accepts settings. The reading unit reads a document that passes through the reading device. The conveyance unit includes: a sheet feed roller for feeding out a document set on a document tray; a first conveyance path ranging from the sheet feed roller to a reading position; a detection part provided on the first conveyance path and serving for detecting whether or not the document is present; a pair of reverse-rotation rollers which rotate forward while nipping the document and then stop in a state discharging a part of the document to outside, and thereafter rotate reverse; a second conveyance path ranging from the reading position to the pair of reverse-rotation rollers; a third conveyance path which has one end connected to the first conveyance path and another end connected to the second conveyance path and which allows the switched-back document to pass therethrough and be fed back to upstream side of the reading position; and a conveyance control section for controlling document conveyance. The pair of reverse-rotation rollers rotate reverse to feed the document onto the third conveyance path. The operation panel accepts double-sided reading of the document, and application of a cutout document mode for reading a cutout document which has a cutout part at its rear end in a document conveyance direction, the cutout part passing through a detection area of the detection part. In a case of double-sided reading of the document and with the cutout document mode unapplied, the conveyance control section stops the pair of reverse-rotation rollers at a time point when the document has been conveyed by a predetermined reference distance since a rear-end passage time point that is a time point when the detection part having so far been detecting a document presence has detected a document absence, and thereafter the conveyance control section starts reverse rotation of the pair of reverse-rotation rollers. In a case of the double-sided reading of the document and with the cutout document mode applied, the conveyance control section stops the pair of reverse-rotation rollers at a time point when the document has been conveyed by a distance resulting from adding an additional distance, which is predetermined or determined based on a recognized cutout width in the document conveyance direction, to the reference distance since the rear-end passage time point, and thereafter the conveyance control section starts reverse rotation of the pair of reverse-rotation rollers.

Further features and advantages of the present disclosure will become apparent from the description of embodiments given below.

BRIEF DESCRIPTION OF THE DRAWINGS

FIG. 12 is a view showing an example of a conveyance flow of an adjustment document in timing adjustment mode according to the embodiment.

DETAILED DESCRIPTION

Figure 1:
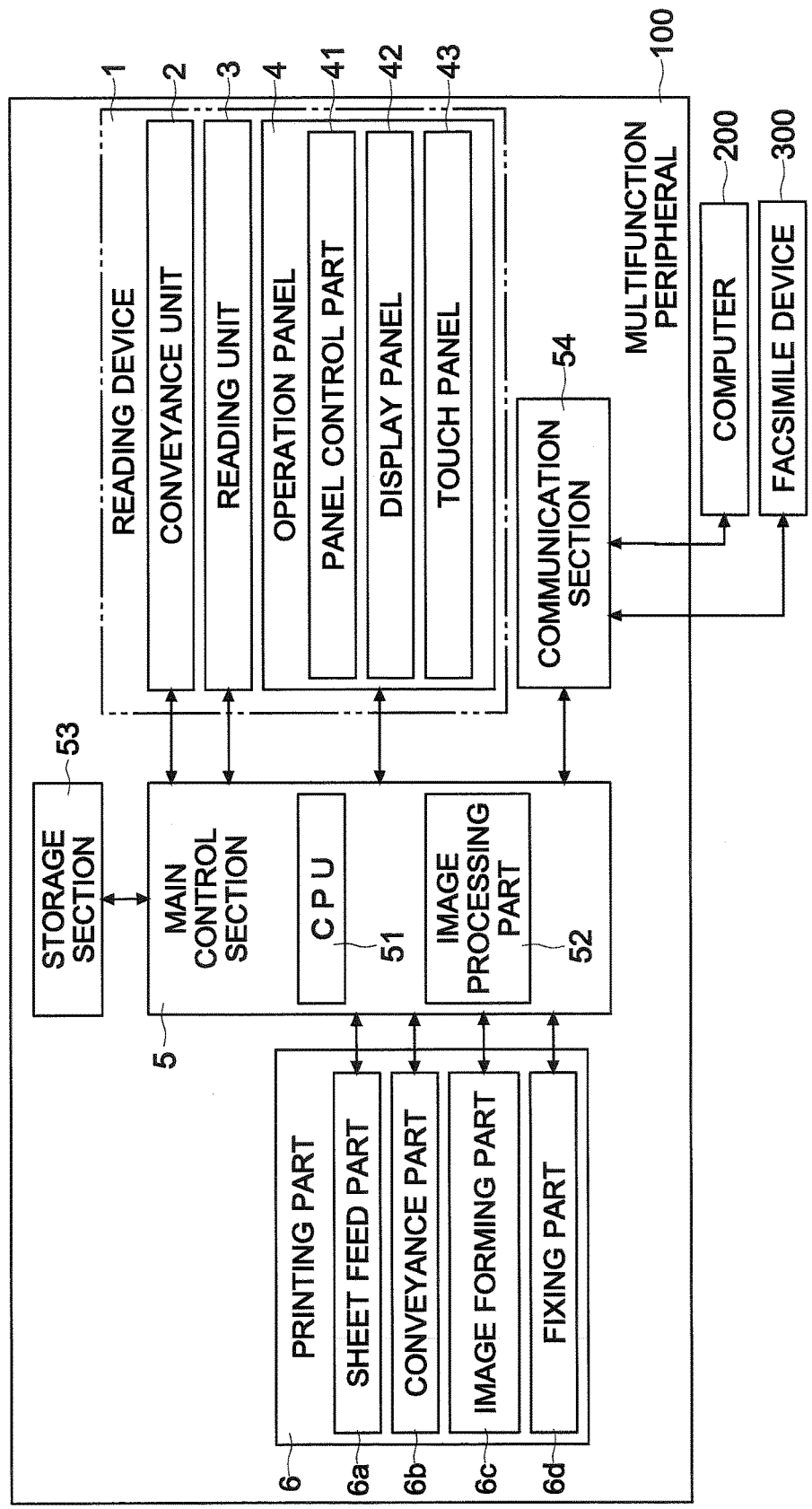
FIG. 1 is a view showing an example of a multifunction peripheral according to an embodiment.

The present disclosure eliminates damage or paper jam of a cutout document in switchback operation. Hereinbelow, an image forming apparatus including a reading device 1 according to the embodiment will be described with reference to FIGS. 1 to 12. The reading device 1 includes a conveyance unit 2, a reading unit 3 and an operation panel 4. In this description, a multifunction peripheral 100 is taken as an example of the image forming apparatus. However, individual elements of the configuration, placement and the like described in embodiments are given merely as a descriptive example without limiting the scope of the disclosure.

(Outline of Multifunction Peripheral 100)

First, an outline of the multifunction peripheral 100 according to the embodiment will be described with reference to FIG. 1.

The multifunction peripheral 100 includes a main control section 5. The main control section 5 controls individual parts contained in the multifunction peripheral 100. The main control section 5 includes a CPU 51, an image processing part 52 for performing image processing of image data to be used for printing and transmission, and other electronic circuits or devices. The CPU 51 performs control of individual parts of the multifunction peripheral 100 as well as arithmetic operation based on control programs and control-dedicated data to be stored in a storage section 53. The storage section 53 is given by a combination of such nonvolatile storage devices as ROM, flash ROM and HDD and such volatile storage devices as RAM.

A conveyance unit 2 and a reading unit 3 are provided in an upper part of the multifunction peripheral 100. The main control section 5 gives an operating instruction to the reading device 1, making the reading device read a document. Image data acquired by the document reading are used for printing (copying function) or transmission (scanning-and-transmitting function) or accumulated in the storage section (box function). Details of the reading device 1 will be described later.

The multifunction peripheral 100 includes an operation panel 4. The operation panel 4 includes a panel control part 41, a display panel 42, and a touch panel 43. The display panel 42 displays a setting screen and such setting images as soft keys. The touch panel 43, provided in association with the display panel 42, outputs a signal indicative of a touch position of the display panel 42. The panel control part 41 controls the display of the display panel 42 and recognizes a setting-dedicated image operated by a user based on an output signal of the touch panel 43. Then, the panel control part 41 accepts the user's setting and displays a screen corresponding to the executed operation on the display panel 42.

The operation panel 4 accepts a setting as to whether both sides of the document are to be read or only one side of the document is to be read. The operation panel 4 also accepts another setting as to whether or not reading is done in a cutout document mode (which will be detailed later). Like this, the operation panel 4 is used also for settings associated with operation of the reading device 1. The operation panel 4 accepts settings of the reading device 1 as well.

The multifunction peripheral 100 includes a printing part 6. The printing part 6 includes a sheet feed part 6a, a conveyance part 6b, an image forming part 6c, and a fixing part 6d. The sheet feed part 6a, having plural paper sheets set therein, feeds out sheets for printing. The conveyance part 6b conveys a sheet fed from the sheet feed part 6a and discharges a fixing-processed sheet out of the apparatus. The image forming part 6c forms a toner image based on printing-dedicated image data and transfers a toner image onto the sheet. The fixing part 6d heats and pressurizes the sheet with the toner image transferred thereon, thereby fixing the toner image on the sheet. The main control section 5 controls the operation of the printing part 6.

A communication section 54 is connected to the main control section 5. The main control section 5 controls operation and communication processing of the communication section 54. The communication section 54 is an interface for performing communications with a computer 200, such as PC or server, and a facsimile device 300. Then, the main control section 5 makes the printing part 6 perform printing based on printing-dedicated data received from the computer 200 or the facsimile device 300 (printing function)

(Reading Device 1)

Next, the reading device 1 according to the embodiment will be described with reference to FIGS. 2 and 3.

The reading device 1 includes a conveyance unit 2 and a reading unit 3. The conveyance unit 2 is provided above the reading unit 3. The conveyance unit 2 conveys the document toward a reading position (toward a conveyed-sheet reading use contact glass 31a of the reading unit 3). The conveyance unit 2 is attached so as to be openable and closable relative to the reading unit 3 vertically on a fulcrum located on the depthwise side of the drawing sheet of FIG. 3. The conveyance unit 2 functions as a cover that presses the individual contact glasses of the reading unit 3 from above.

The conveyance unit 2 includes a conveyance control section 20 for controlling the conveyance of paper sheets. The conveyance control section 20 includes a CPU 20a and a memory 20b. The memory 20b stores therein programs and data relating to document conveyance control. The CPU 20a controls document conveyance by using programs and data stored in the memory 20b.

Figure 3:
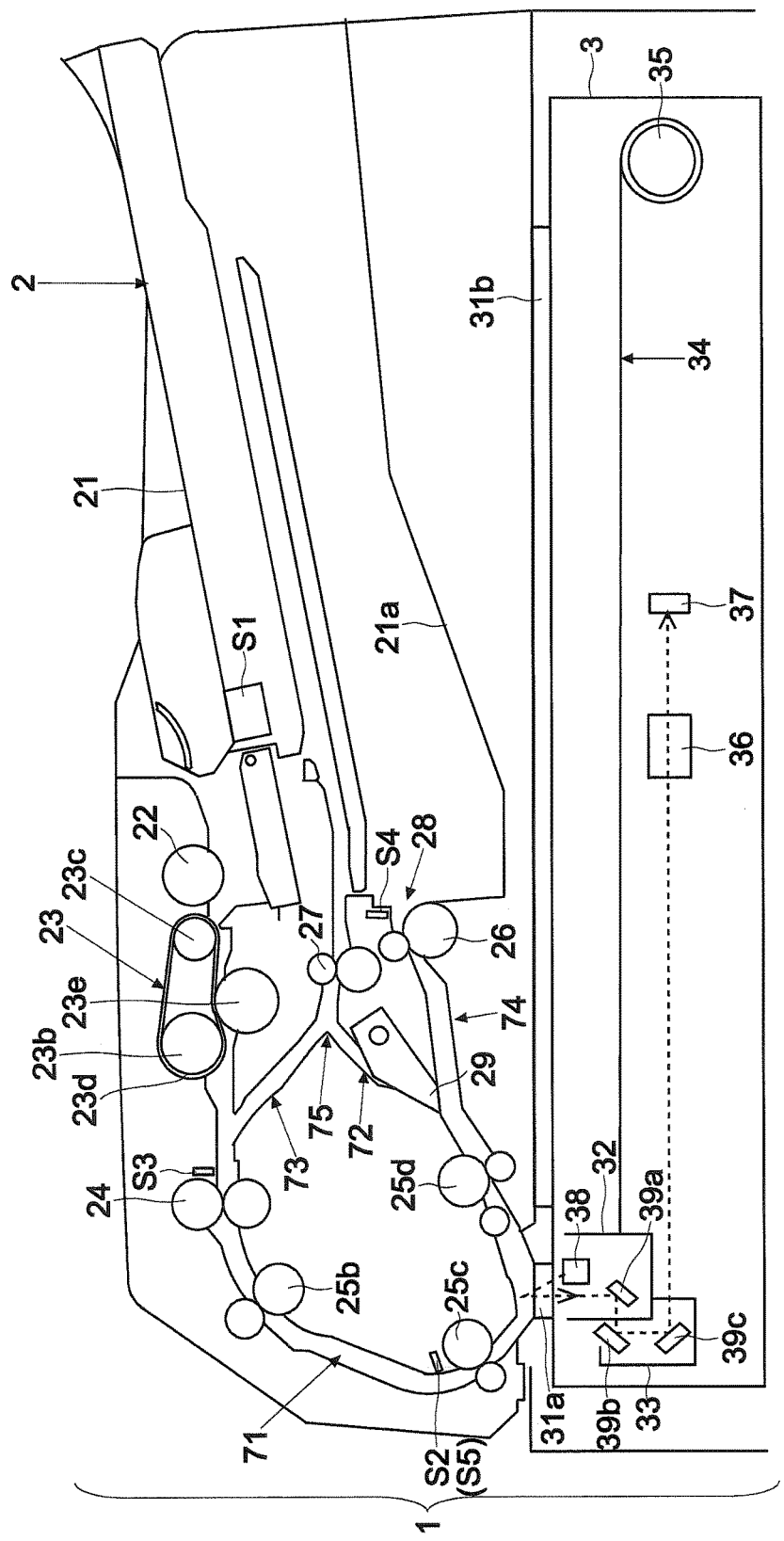
FIG. 3 is a view showing an example of the reading device to an embodiment.

As shown in FIG. 3, the conveyance unit 2 includes a document tray 21 on which a document is to be set. The conveyance unit 2 includes a sheet feed roller 22, a separating-and-conveying part 23, a pair of registration rollers 24, a pair of first conveyance rollers 25b, a pair of second conveyance rollers 25c, a pair of third conveyance rollers 25d, a pair of discharge rollers 26, a pair of reverse-rotation rollers 27 (equivalent to a conveyance rotator), and a movable guide plate 29. Like this, the conveyance unit 2, including a rotator for conveying and discharging a document, discharges an after-reading document through a discharge port 28 onto a document discharge tray 21a.

The separating-and-conveying part 23 includes a driving roller 23b, a driven roller 23c, a sheet feed belt 23d, and a separation roller 23e. The sheet feed belt 23d is stretched around the driving roller 23b and the driven roller 23c. During document conveyance, the driving roller 23b, the driven roller 23c, and the sheet feed belt 23d rotate in the document conveyance direction. The separation roller 23e rotates in a direction opposite to the document conveyance direction. While a double-sheet feed is occurring, the separation roller 23e separates off a lower-side sheet out of the stacked document sheets and feeds back the sheet toward the document tray 21.

Figure 2:
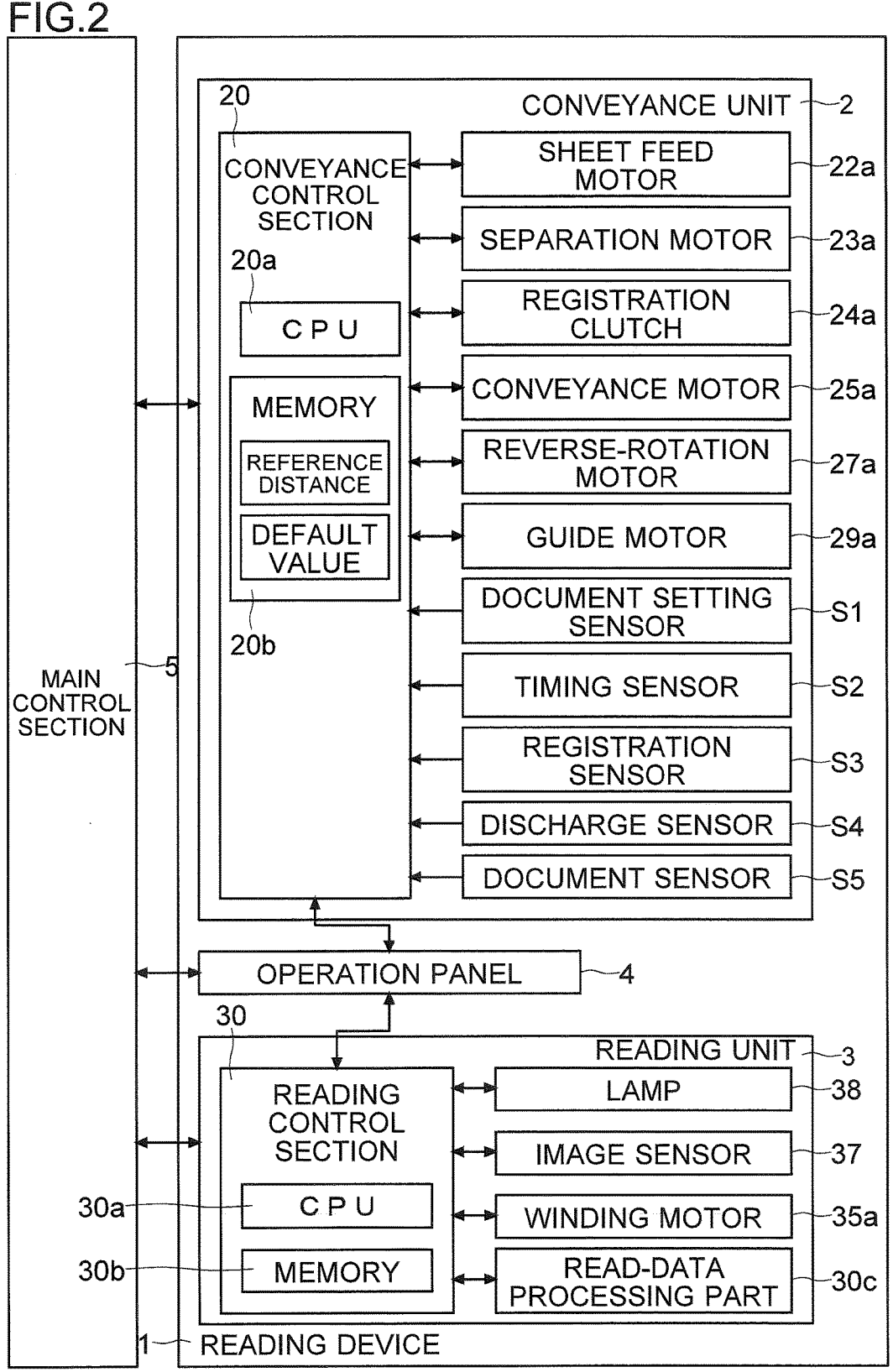
FIG. 2 is a view showing an example of a reading device to an embodiment.

As shown in FIG. 2, the conveyance unit 2 includes a sheet feed motor 22a, a separation motor 23a, a registration clutch 24a, a conveyance motor 25a, a reverse-rotation motor 27a, and a guide motor 29a. The sheet feed motor 22a rotates the sheet feed roller 22 and the driving roller 23b. The separation motor 23a operates the separation roller 23e. The conveyance motor 25a rotates the pair of first conveyance rollers 25b, the pair of second conveyance rollers 25c, the pair of third conveyance rollers 25d, and the pair of discharge rollers 26. The reverse-rotation motor 27a rotates the pair of reverse-rotation rollers 27. It is noted that the reverse-rotation motor 27a is enabled to rotate both forward and reverse. The guide motor 29a pivots the movable guide plate 29. The conveyance control section 20 controls operations of the individual motors.

The conveyance unit 2 includes, as passages for guidance of a document, a first conveyance path 71, a second conveyance path 72, a third conveyance path 73, and a discharge conveyance path 74. The first conveyance path 71 is a pathway ranging from the sheet feed roller 22 to the reading position (conveyed-sheet reading use contact glass 31a). The pair of registration rollers 24, the pair of first conveyance rollers 25b, and the a pair of second conveyance rollers 25c are provided along the first conveyance path 71. The second conveyance path 72 is a pathway ranging from the reading position to the pair of reverse-rotation rollers 27. The pair of third conveyance rollers 25d and the pair of reverse-rotation rollers 27 are provided on the second conveyance path 72. The third conveyance path 73 has one end connected to the first conveyance path 71 and the other end connected to the second conveyance path 72. Also, the third conveyance path 73 is a conveyance path for allowing a switched-back document to be passed along so that the document is fed back to the upstream side of the reading position. The discharge conveyance path 74 has one end connected to the discharge port 28 and the other end connected to the second conveyance path 72. The pair of discharge rollers 26 are provided on the discharge conveyance path 74.

The pair of reverse-rotation rollers 27 perform a switch-back operation in which the reverse-rotation rollers 27, are rotated forward while nipping a document, and then are stopped with a part of the document discharged out of the apparatus and subsequently are rotated reverse to feed the document onto the third conveyance path 73.

On the way of the second conveyance path 72 (between the pair of third conveyance rollers 25d and the pair of discharge rollers 26), the movable guide plate 29 is provided. The guide motor 29a rotates the movable guide plate 29 to switch over the document conveyance path. For double-sided reading of the document, the movable guide plate 29 is rotated to guide the document toward the pair of reverse-rotation rollers 27. On the other hand, for only single-sided reading of the document or for discharge of the document upon completion of the double-sided reading, the movable guide plate 29 closes the path toward the pair of reverse-rotation rollers 27 to guide the document to the pair of discharge rollers 26 (discharge conveyance path 74).

The conveyance unit 2 includes such sensors as a document setting sensor S1, a timing sensor S2 (equivalent to detection part), a registration sensor S3, and a discharge sensor S4. The document setting sensor S1 is provided on the document tray 21. The document setting sensor S1 is a sensor, such as transmission type optical sensor or reflection type optical sensor, which varies in output depending on the presence or absence of a set document. Based on an output of the document setting sensor S1, the conveyance control section 20 recognizes whether or not a set document is present on the document tray 21.

The timing sensor S2 and the registration sensor S3 are sensors for detecting whether or not a document is present at their installation positions (detection areas). The timing sensor S2 and the registration sensor S3 are transmission type optical sensors each of which has an actuator that is turned (moved in position) upon contact of the document therewith, where the state of optical transmission varies depending on the position of the actuator.

The registration sensor S3 is provided near the upstream side of the pair of registration rollers 24 in the first conveyance path 71. Based on an output of the registration sensor S3, the conveyance control section 20 recognizes whether or not the document has reached the installation position of the registration sensor S3 (pair of registration rollers 24) and further recognizes whether or not the document has passed through the detection area.

The timing sensor S2 is provided on the upstream side of the reading position (reading line) in the first conveyance path 71. More specifically, the timing sensor S2 is provided at a point which is on the downstream side of the registration sensor S3 and which is near the upstream side of the pair of second conveyance rollers 25c. The conveyance control section 20, based on an output of the timing sensor S2, recognizes whether or not the document has reached the installation position of the timing sensor S2 (up to immediately before the reading position) and further recognizes whether or not the document has passed through the detection area.

The discharge sensor S4 is provided near the discharge port 28 for discharge of the document to the document discharge tray 21a. More specifically, the discharge sensor S4 is provided on the downstream side of the pair of discharge rollers 26. The conveyance control section 20, based on an output of the discharge sensor S4, recognizes whether or not the document has been discharged to the document discharge tray 21a.

The reading unit 3 includes a reading control section 30 for control of reading. The reading control section 30 includes a CPU 30a and a memory 30b. The memory 30b stores therein programs and data relating to document reading. The CPU 30a controls reading of the document by using the programs and data stored in the memory 30b.

The reading unit 3 includes, on its top surface, a conveyed-sheet reading use contact glass 31a and a resting-and-reading use contact glass 31b (see FIG. 3). The reading unit 3 also includes a first moving frame 32, a second moving frame 33, a wire 34, a winding drum 35, a lens 36, and an image sensor 37. The first moving frame 32 is provided with a lamp 38 and a first mirror 39a. The second moving frame 33 is provided with a second mirror 39b and a third mirror 39c.

The lamp 38 illuminates the document with light. Reflected light from the document is led to the lens 36 by the individual mirrors. The lens 36 condenses the reflected light, letting the reflected light to be incident on the image sensor 37. The image sensor 37 performs photoelectric conversion of the reflected light. The wire 34 has one end connected to the first moving frame 32 and the second moving frame 33 and the other end connected to the winding drum 35. Rotating the winding drum 35 allows the reading line (illuminating position of the lamp 38) to be moved.

For reading of the document set on the resting-and-reading use contact glass 31b, the reading control section 30 rotates a winding motor 35a that makes the winding drum 35 rotated, so that the position of the reading line is moved from left end to right end of the resting-and-reading use contact glass 31b. For reading of the document that passes over the upper side of the conveyed-sheet reading use contact glass 31a (reading position), on the other hand, the reading control section 30 rotates the winding motor 35a so as to align the position of the reading line to a position within a range of the conveyed-sheet reading use contact glass 31a. In addition, in the conveyance unit 2, a white guide plate is provided at a position corresponding to the top surface of the conveyed-sheet reading use contact glass 31a.

During the document reading, the image sensor 37 outputs analog signals of a plurality of pixels (light-receiving elements) corresponding to one line. A read-data processing part 30c provided in the reading unit 3 performs adjustment of analog signals, ND conversion, and correction of acquired image data. In this way, image data based on reading of the document are obtained.

(Double-Sided Reading of Normal Document)

Next, double-sided reading of a normal document (cutout-free document) by the reading device 1 according to the embodiment will be described with reference to FIGS. 4 and 5.

Below given is a description of double-sided reading of a document to be executed while the document is being conveyed (i.e., conveyed-sheet reading operation). In cases where a plurality of document sheets are set up, the flowchart of FIG. 4 is executed for each of those document sheets.

Figure 4:
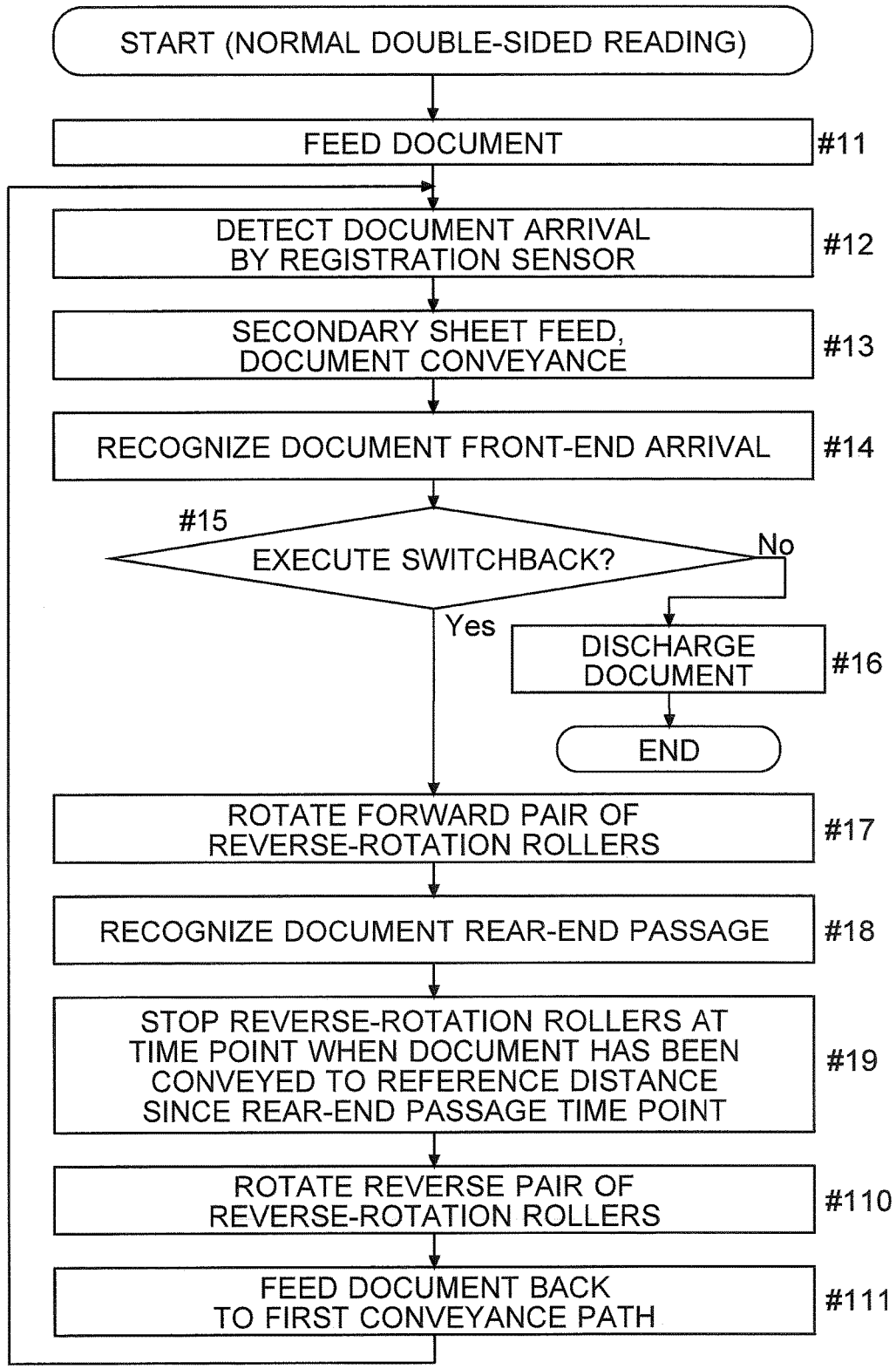
FIG. 4 is a flowchart showing an example of an operational flow of a conveyance unit in normal double-side reading with the reading device according to the embodiment.

A state before the start of FIG. 4 is that the conveyance control section 20 is recognizing a document setting on the document tray 21. In other words, the start of FIG. 4 is a time point when an instruction for execution of a reading job is given on the operation panel 4 in the above-described state. The start is a time point when the user gives an instruction for execution of normal double-sided reading (double-sided reading of a normal document) without setting the cutout document mode.

The conveyance control section 20 makes the sheet feed motor 22a start rotating and the sheet feed roller 22 and the separating-and-conveying part 23 feed a document (step #11). The conveyance control section 20 also recognizes an arrival of the document at the registration sensor S3 (pair of registration rollers 24) (step #12). On this occasion, the document, while continued being fed, is bumped against the pair of registration rollers 24 so as to be flexed for the purpose of skew correction of the document.

When a predetermined flexure generation time has elapsed since a detection of document arrival by the registration sensor S3, the conveyance control section 20 makes the pair of registration rollers 24 execute a secondary sheet feed, followed by conveying the document (step #13). More specifically, the conveyance control section 20 rotates the conveyance motor 25a, with the registration clutch 24a linked thereto. As a result, the pair of registration rollers 24, the pair of first conveyance rollers 25b, the pair of second conveyance rollers 25c, the pair of third conveyance rollers 25d, and the pair of discharge rollers 26 are rotated, by which the document is conveyed. In addition, although not shown in the flowchart, when the registration sensor S3 detects a passage of the rear end of the document, the conveyance control section 20 releases the registration clutch 24a and further stops the rotation of the sheet feed motor 22a so that the next document is prevented from being fed.

After that, the conveyance control section 20 recognizes an arrival of the document front end at the installation position (detection area) of the timing sensor S2 based on an output of the timing sensor S2 (step #14, recognition of front-end arrival time point). The conveyance control section 20 checks whether or not switchback is executed (step #15). Execution of one-time switchback causes the document to be reversed between top and bottom in comparison between document setting and document discharge occasions. Accordingly, the conveyance control section 20 makes the pair of reverse-rotation rollers 27 execute the switchback operation two times, and thereafter makes the pair of discharge rollers 26 execute the document discharge through the discharge port 28. As a result of this, the document is made coincident in its top-and-bottom position between document setting and discharge occasions.

Therefore, when the number of switchback executions with a current document is zero times or one time (when the number of recognitions of front-end arrival of the current document is the first time or the second time), the conveyance control section 20 decides that switchback is executed (Yes at step #15). Meanwhile, when switchback has already been executed two times, the conveyance control section 20 decides that the document is discharged to the document discharge tray 21*a* without executing the switchback (No at step #15).

Figure 5A:
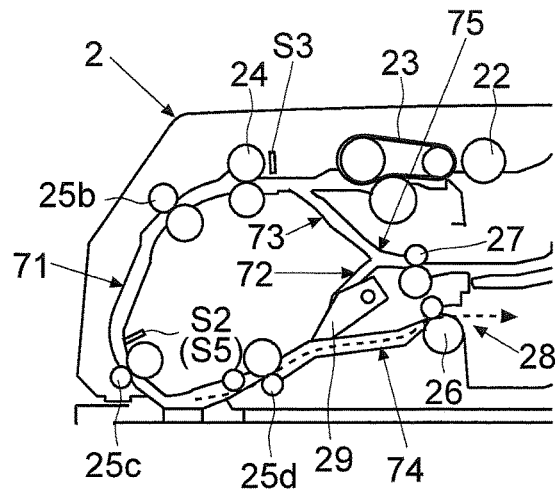
FIG. 5A is a view showing a state of a movable guide plate for guiding a document to a discharge conveyance path.
Figure 5B:
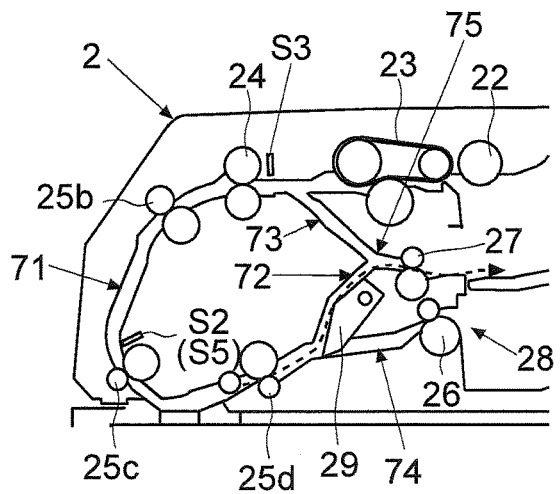
FIG. 5B is a view showing a state of the movable guide plate for introducing the document to a reverse roller pair.
Figure 5C:
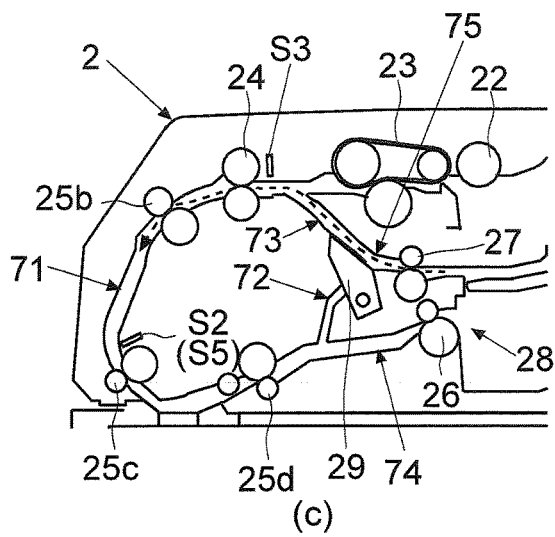
FIG. 5C is a view showing a state of the movable guide plate for introducing the document to a third conveyance path.

When the document is discharged to the document discharge tray 21*a* (No at step #15), the conveyance control section 20 rotates the guide motor 29*a*, causing the movable guide plate 29 to be in such a state that the document is led to the discharge conveyance path 74 (the state of FIG. 5A). Then, the conveyance control section 20 recognizes document discharge by means of the discharge sensor S4, stopping the rotation of all the motors (all the rotators) (step #16→END). In addition, when it is recognized based on an output of the document setting sensor S1 that a document is present on the document tray 21, the conveyance control section 20 may make part of the motors, such as the conveyance motor 25*a*, continued rotating.

On the other hand, when switchback is executed in the case of double-sided reading of a normal document (Yes at step #15), the conveyance control section 20, for the sake of switchback, starts forward rotation of the reverse-rotation motor 27*a* so that the pair of reverse-rotation rollers 27 are rotated in the forward direction (the direction in which the document is discharged from the pair of reverse-rotation rollers 27 out of the apparatus) (step #17). The conveyance control section 20 starts the guide motor 29*a*, causing the movable guide plate 29 to be in such a state that the path to the discharge conveyance path 74 is closed (the state of FIG. 5B), by which the document is led to the pair of reverse-rotation rollers 27.

The document conveyance being continued, then the conveyance control section 20, based on an output of the timing sensor S2, recognizes that the document rear end has passed through the detection area of the timing sensor S2 (step #18, recognition of a rear-end passage time point).

When a predetermined top-side start time has elapsed since a time point of a first document-front-end arrival detection by the timing sensor S2 (step #14), the reading control section 30 starts reading of the document top side. The top-side start time is so determined that the reading is started with the front end of the top surface of the document. Also, when a predetermined bottom-side start time has elapsed since a time point of a second document-front-end arrival detection by the timing sensor S2 (step #14), the reading control section 30 starts reading of the document bottom side. The bottom-side start time is so determined that the reading is started with the front end of the document bottom side.

When a predetermined top-side end time has elapsed since a first document-rear-end passage detection by the timing sensor S2 (step #18), the reading unit 3 ends the reading of the document top side. The top-side end time is so determined that the reading is ended with a top-side rear end of the document. Also, when a predetermined bottom-side end time has elapsed since a time point of a second document-rear-end passage detection by the timing sensor S2 (step #18), the reading unit 3 ends the reading of the document bottom side. The bottom-side end time is so determined that the reading is ended with the rear end of the document bottom side.

At a time point when the document has been conveyed by a predetermined reference distance since a rear-end passage time point, the conveyance control section 20 stops the pair of reverse-rotation rollers 27 (step #19). The reference distance is so determined that the switched-back document is fed onto the third conveyance path 73 (that the document rear end passes through a branch position 75 between the second conveyance path 72 and the third conveyance path 73). The reference distance is determined based on a distance from the installation position of the timing sensor S2 to the branch position 75. The reference distance is longer than the distance from the installation position of the timing sensor S2 to the branch position 75. Also, the reference distance is shorter than the distance from the installation position of the timing sensor S2 to the nip of the pair of reverse-rotation rollers 27. For example, the reference distance may be set to a length from the installation position of the timing sensor S2 to an intermediate point between the branch position 75 and the nip of the pair of reverse-rotation rollers 27. Like this, the reference distance is set to such a length that in double-sided reading of a normal document, at a time point when the pair of reverse-rotation rollers 27 are stopped, the document rear end securely passes through the branch position 75 and moreover the pair of reverse-rotation rollers 27 are securely nipping the normal document. Data indicative of the reference distance are preparatorily stored in the memory 20*b* (see FIG. 2).

In this connection, the reverse-rotation motor 27*a* may be provided by a stepping motor. A document conveyance distance corresponding to one pulse of the stepping motor is determinate. Therefore, the conveyance control section 20 stops the reverse-rotation motor 27*a* at a time point when the pulses corresponding to the reference distance are inputted to the stepping motor by counting since the time point of passage of the document rear end through the timing sensor S2. A number of steps necessary for a slowdown from a constant-speed rotating state to a stop is also determinately known. Thus, the conveyance control section 20 starts the slowdown of the reverse-rotation motor 27*a* since a time point that goes back as far as the number of steps necessary for the slowdown, from the pulses corresponding to the reference distance.

The conveyance control section 20 makes the reverse-rotation motor 27*a* rotate reverse and the pair of reverse-rotation rollers 27 rotate reverse (step #110). In this case, the conveyance control section 20 makes the guide motor 29*a* rotate, causing the movable guide plate 29 to be in such a state that the path toward the upstream side of the second conveyance path 72 is closed (the state of FIG. 5C). The conveyance control section 20 leads the document to the third conveyance path 73 (pair of registration rollers 24).

The conveyance control section 20 feeds back the document to the first conveyance path 71 (to the upstream side of the pair of registration rollers 24) (step #111). In addition, although not shown in the flowchart because the timing differs depending on the document size, the conveyance control section 20 stops the reverse-rotation motor 27*a* at a time point of a rear-end passage detection by the timing sensor S2 or a time point of a document-front-end arrival detection by the timing sensor S2. After step #111, by merging of the document onto the first conveyance path 71, the conveyance control section 20 recognizes a document arrival at the registration sensor S3 (pair of registration rollers 24) (return to step #12). From this on, the flow continues until the document is discharged to the document discharge tray 21*a*.

(Double-Sided Reading of Cutout Document 8)

Next, double-sided reading of a cutout document 8 by the reading device 1 according to the embodiment will be described with reference to FIGS. 6 to 10.

The reading device 1 (multifunction peripheral 100) has a cutout document mode. The cutout document mode is a mode for reading the cutout document 8 while preventing the document from being damaged or jamming.

Figure 6:
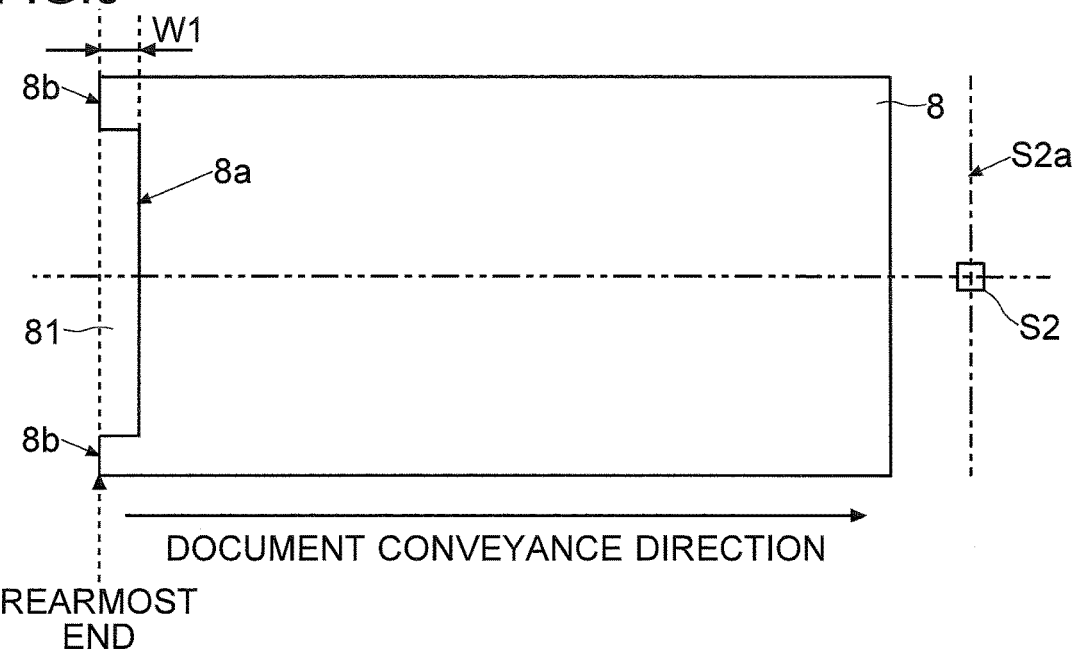
FIG. 6 is a view showing an example of a cutout document.

The cutout document 8 is a document in which its rear end in the document conveyance direction is partly cut off. There are some cases where the reading device 1 may read a document which is partly cut out due to cutting-off or other working. FIG. 6 illustrates an example of the cutout document 8 having a rear end cut off in a recessed or depressed shape. The cutout document 8 herein refers to a document of which the cutout portion 81 passes through the detection area of the timing sensor S2 (see FIG. 6).

The conveyance control section 20 recognizes a time point at which the output of the timing sensor S2 changes from a level under detection of document presence to a level under detection of document absence (a time point when a HIGH-to-LOW change or a LOW-to-HIGH change occurs). That is, the conveyance control section 20 recognizes a time point when the rear end 8*a* (see FIG. 6) of the cutout document 8 passes through the installation position of the timing sensor S2 (rear-end passage time point).

In the case where the cutout portion 81 and the position (detection area) of the timing sensor S2 overlap with each other, the conveyance control section 20 recognizes that whereas a rearmost end 8*b* (see FIG. 6) of the cutout document 8 has not passed through the position (installation line; a line S2*a* passing through the position of the timing sensor S2 and extending along a direction perpendicular to the conveyance direction of the cutout document 8, the line S2*a* being indicated by one-dot chain line in FIG. 6) of the timing sensor S2 in the conveyance direction of the cutout document 8, the rear end of the cutout document 8 has passed through the line S2*a*. That is, with the cutout document 8, passage of its rear end is detected earlier than with normal documents because of the cutout. The detection of passage of the document rear end by using the timing sensor S2 is advanced by a time duration corresponding to the width (cutout width W1) of the cutout portion 81 in the document conveyance direction.

Figure 7:
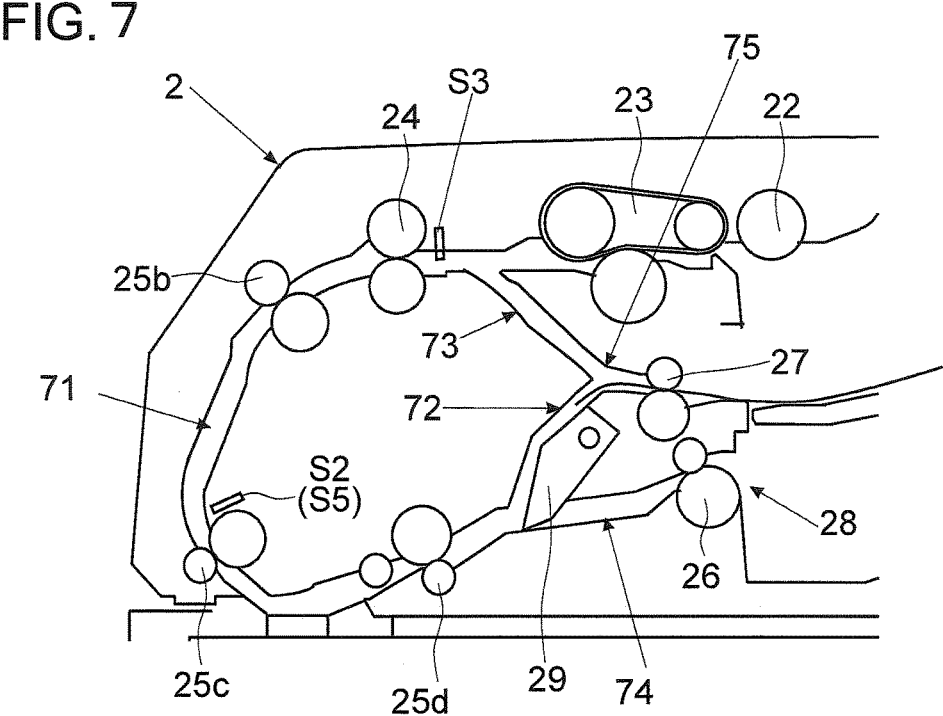
FIG. 7 is a view showing an example of switchback with a cutout document involved in double-side reading.

There are some cases where, as shown in FIG. 7, reverse rotation (switchback) of the pair of reverse-rotation rollers 27 is started while the rearmost end 8*b* of the cutout document 8 has not passed through the branch position 75 between the second conveyance path 72 and the third conveyance path 73. An excessively earlier start of the switchback of the cutout document 8 would cause the cutout document 8 to be fed reverse or cause the pair of reverse-rotation rollers 27 to be rotated reverse with the cutout document 8 remaining pinched by the movable guide plate 29. As a result, the cutout document 8 may be damaged or involved in jamming. Thus, the reading device 1 (multifunction peripheral 100) according to the embodiment has the cutout document mode for preventing the cutout document 8 from jamming or being damaged in the process of double-sided reading.

The processing flow for double-sided reading while conveying (conveyed-sheet reading) one-sheet cutout document 8 will be described with reference to FIG. 8. In addition, also when a plurality of sheets of cutout document 8 are set on the document tray 21, the flowchart of FIG. 8. is executed for each sheet of the cutout document 8.

Figure 8:
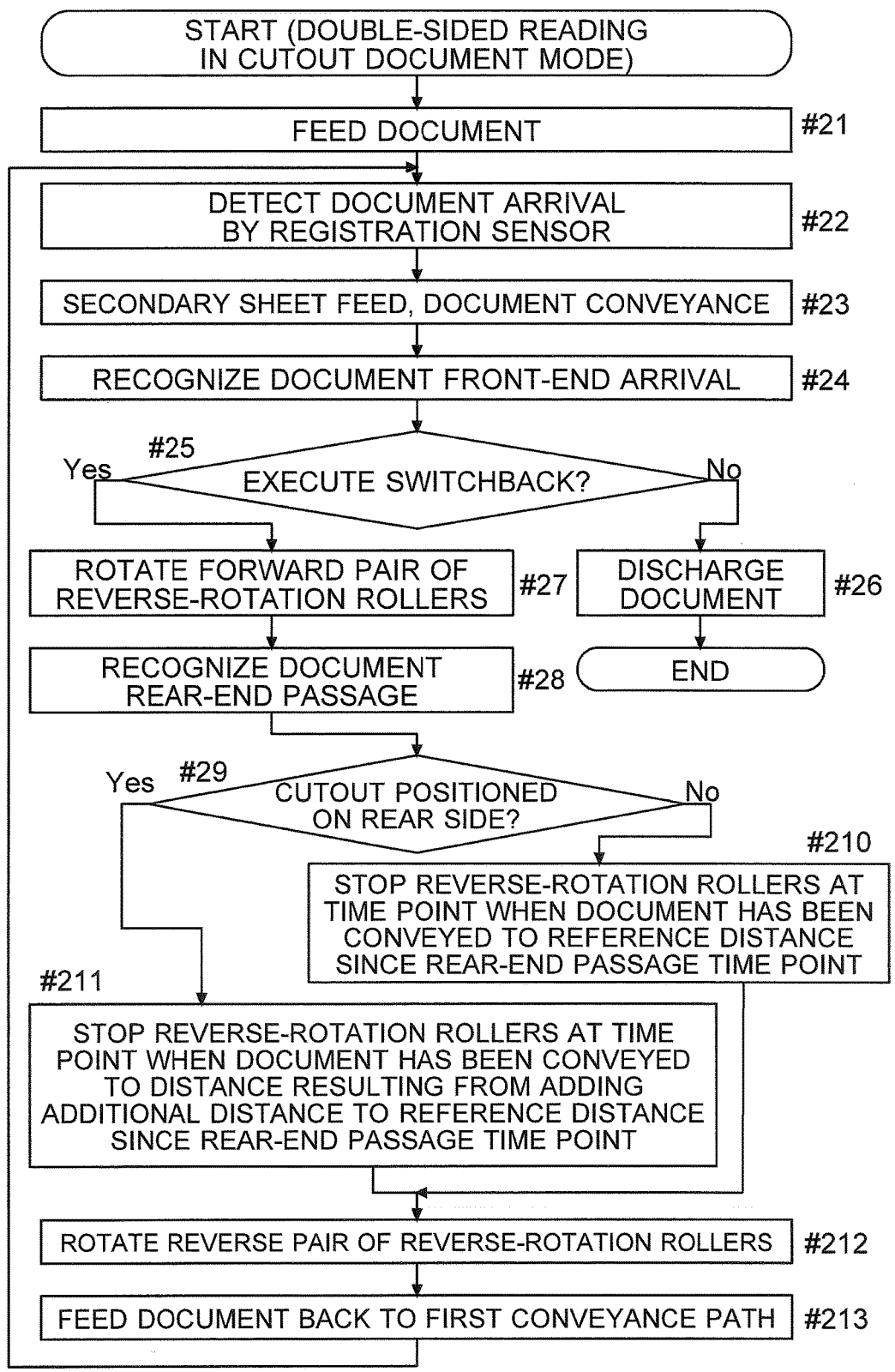
FIG. 8 is a flowchart showing an example of an operational flow of the conveyance unit in double-side reading of a cutout document with the reading device according to the embodiment.

A state before the start of FIG. 8 is that the conveyance control section 20 is recognizing a document setting on the document tray 21. Also, the state is that the operation panel 4 is accepting double-sided reading of the document. Still also, the state is that the operation panel 4 is accepting an input indicative of applying the cutout document mode. Then, the start of FIG. 8 is a time point when an instruction for execution of a reading job is given on the operation panel 4. In other words, the start is a time point when the user gives an instruction for execution of double-sided reading of the cutout document 8.

The cutout document 8 is set on the document tray 21 so that the cutout portion 81 is positioned on the rear side (upstream side). This is derived in consideration of cases where setting the cutout document 8 with the cutout portion 81 on the front side (downstream side) would make it likely that the cutout document 8 is unsuccessfully fed. Thus, the conveyance control section 20 may display, on the display panel 42, a notice indicative that the document should be set with the cutout portion 81 positioned on the rear side.

Steps #21 to #28 are the same as steps #11 to #18 of FIG. 4. The description of the latter can be used as aid for description of the former. Therefore, the steps #21 to #28 will be described below with their contents reduced. At step #21, the conveyance control section 20 makes the sheet feed motor 22*a* start rotating to feed the cutout document 8. At step #22, the conveyance control section 20 recognizes an arrival of the cutout document 8 at the registration sensor S3 (pair of registration rollers 24). At step #23, the conveyance control section 20 makes the pair of registration rollers 24 execute a secondary sheet feed of the cutout document 8. At step #24, the conveyance control section 20 recognizes an arrival of the cutout document 8 at the installation position of the timing sensor S2. At step #25, the conveyance control section 20 recognizes whether or not switchback is executed. Also in the cutout document mode, the conveyance control section 20 makes the pair of reverse-rotation rollers 27 execute the switchback operation two times, and thereafter, makes the pair of discharge rollers 26 discharge the cutout document 8. When the cutout document 8 is discharged to the document discharge tray 21*a* (No at step #25), the conveyance control section 20 recognizes a discharge of the cutout document 8 by means of the discharge sensor S4, stopping the rotation of all the motors (all the rotators) (step #26→END).

On the other hand, when switchback of the cutout document 8 is executed in the case of double-sided reading with the cutout document mode applied (Yes at step #25), the conveyance control section 20, at step #27, makes the pair of reverse-rotation rollers 27 rotate in the forward direction (the direction in which the cutout document 8 is discharged from the pair of reverse-rotation rollers 27 out of the apparatus). At step #28, based on an output of the timing sensor S2, the conveyance control section 20 recognizes a passage of the rear end 8*a* of the cutout document 8 through the installation position of the timing sensor S2.

Also in the cutout document mode, the reading unit 3 starts reading of the document top side when a predetermined top-side start time has elapsed since a time point of a first document-front-end arrival detection by the timing sensor S2 (step #24). Also, the reading unit 3 starts reading of the document bottom side when a predetermined bottom-side start time has elapsed since a time point of a second document-front-end arrival detection by the timing sensor S2 (step #24). Also in the cutout document mode, the reading unit 3 ends the reading of the document top side when a predetermined top-side end time has elapsed since a first document-rear-end passage detection by the timing sensor S2 (step #28). Also, when a predetermined bottom-side end time has elapsed since a time point of a second document-rear-end passage detection by the timing sensor S2 (step #28), the reading unit 3 ends the reading of the document bottom side.

Subsequently, the conveyance control section 20 checks whether or not the cutout portion 81 is positioned on the document rear side (upstream side in the document conveyance direction) (step #29). In this embodiment, the document is set so that the cutout portion 81 is positioned on the document rear side (upstream side).

Therefore, when switchback has never been executed (when the document-rear-end passage of the cutout document 8 is recognized for the first time), the conveyance control section 20 decides that the cutout portion 81 is positioned on the document rear side (upstream side) (Yes at step #29). After the switchback is executed, on the other hand, front and rear of the document are reversed. Accordingly, in the case where switchback has once been executed (when a second document-rear-end passage of the cutout document 8 is recognized), the conveyance control section 20 regards the document front side (downstream side) as the cutout portion 81 (No at step #29).

When the document front side (downstream side) is regarded as the cutout portion 81 No at step #29), the conveyance control section 20, as in the reading of a normal document, stops the pair of reverse-rotation rollers 27 at a time point when the document has been conveyed by a predetermined reference distance since the document-rear-end passage time point (step #210).

On the other hand, when the document rear side (upstream side) is regarded as the cutout portion 81 (Yes at step #29), the conveyance control section 20 stops the pair of reverse-rotation rollers 27 at a time point when the cutout document 8 has been conveyed by a distance resulting from adding an additional distance to a reference distance since the document-rear-end passage time point (step #211). That is, with the double-sided reading and the cutout document mode applied, when the cutout portion 81 of the cutout document 8 is positioned on the rear side of the document, the conveyance control section 20 stops the pair of reverse-rotation rollers 27 at a time point when the document has been conveyed by a distance resulting from adding the additional distance to the reference distance since the document rear-end passage time point.

In this connection, FIG. 6 shows the width (cutout width W1) of the cutout portion 81 in the document conveyance direction. The additional distance is determined based on a predetermined cutout width W1 or a recognized cutout width W1. More specifically, the additional distance may be set to the cutout width W1. Otherwise, the additional distance may be set to a length resulting from adding a margin to the cutout width W1 so as to allow the rearmost end 8b of the cutout document 8 to completely pass through the branch position 75 of the second conveyance path 72 and the third conveyance path 73.

Figure 9:
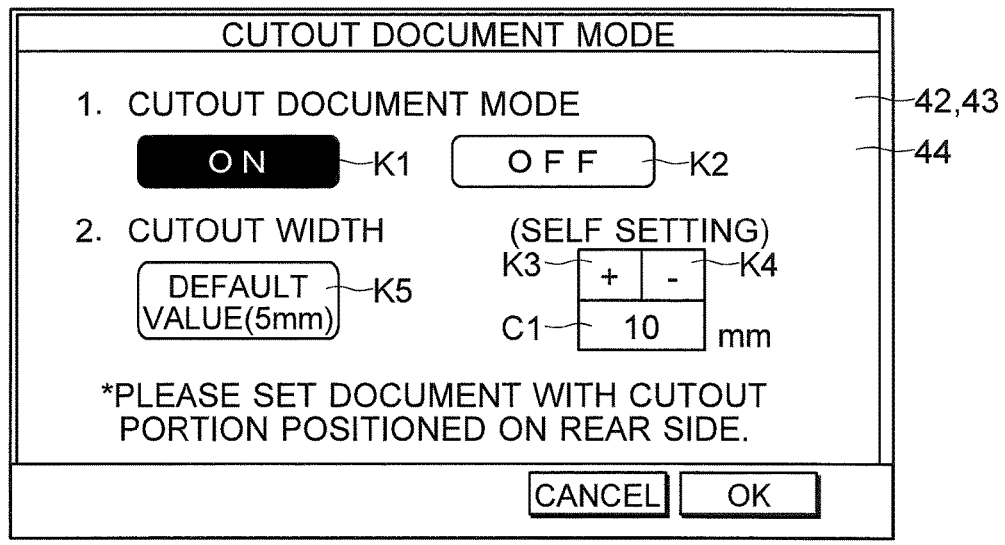
FIG. 9 shows a cutout-document setting screen according to the embodiment.

The operation panel 4 may accept an input of the cutout width W1. The conveyance control section 20 (or main control section 5) may make the display panel 42 display such a cutout document setting screen 44 as shown in FIG. 9 under the condition that the cutout document mode is selected (applied).

The conveyance control section 20 may display, on the cutout document setting screen 44, an ON key K1 and an OFF key K2 for deciding whether or not the cutout document mode is used (selected). The user operates the ON key K1 for use of the cutout document mode. On the other hand, the user operates the OFF key K2 for non-use of the cutout document mode. FIG. 9 shows an example in which the ON key K1 is displayed in an inverted state for the setting that the cutout document mode is used.

Also, the conveyance control section 20 may display, on the cutout document setting screen 44, a width display field C1, a plus key K3 and a minus key K4 for manually inputting the cutout width W1. Each time the plus key K3 is operated once, the cutout width W1 within the width display field C1 is incremented by 1 mm. Each time the minus key K4 is operated once, the cutout width W1 in the width display field C1 is decremented by 1 mm. FIG. 9 shows a state in which the cutout width W1 is set to 10 mm.

The conveyance control section 20 may display a default value key K5 on the cutout document setting screen 44. When the cutout width W1 is coincident with the default value, the user operates the default value key K5. The default value for the cutout width W1 is previously determined. The default value is stored in a storage device such as the memory 20b (see FIG. 2). The operation panel 4 accepts an input of changing the default value. When the default value is changed, the memory 20b stores a default value resulting from the change. When the default value key K5 is operated, the conveyance control section 20 treats the default value as the cutout width W1.

Based on the settings on the operation panel 4 (display panel 42, touch panel 43), the conveyance control section 20 may recognize an inputted cutout width W1. The conveyance control section 20 defines, as the additional distance, the recognized cutout width W1 or a length resulting from adding a predetermined margin to the recognized cutout width W1.

Figure 10:
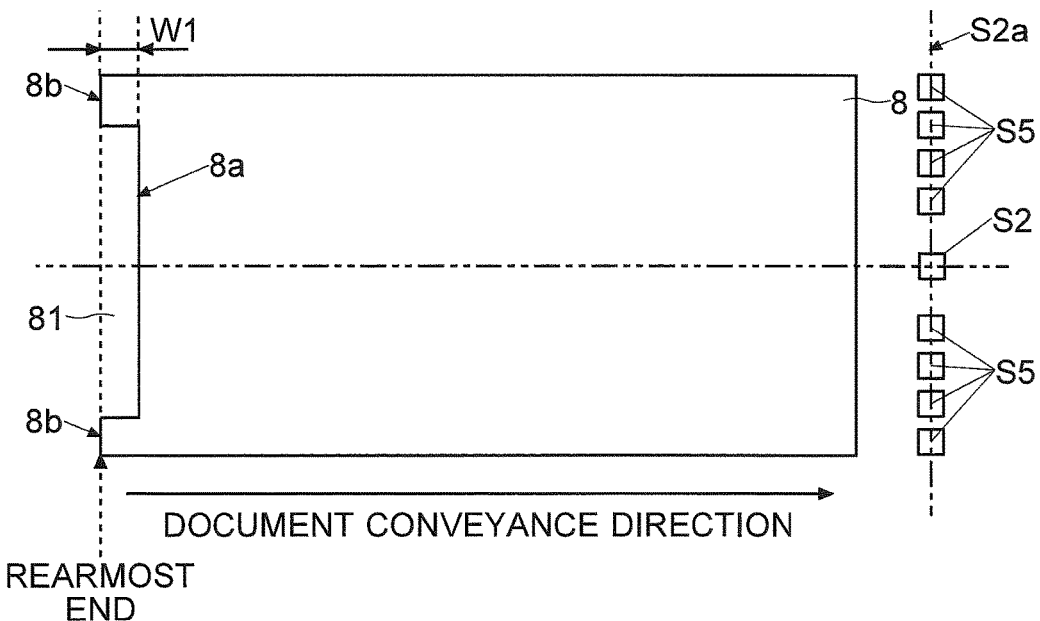
FIG. 10 is a view showing an installation example of a document sensor according to the embodiment.

The conveyance unit 2 may be so designed as to be able to automatically recognize the cutout width W1. In this case, a plurality of document sensors S5 are provided on a way of the first conveyance path 71. Each document sensor S5 is a sensor for detecting whether or not a document is present in its detection area. The document sensor S5 may be a transmission- or reflection-type optical sensor, like the timing sensor S2 and the registration sensor S3. Plural document sensors S5 may be provided at positions which are coincident in the document conveyance direction with the timing sensor S2 and which are different in a direction (main scanning direction) perpendicular to the document conveyance direction from one another. The plurality of document sensors S5 may be provided in a straight line along a direction perpendicular to the document conveyance direction. FIG. 10 shows an example in which eight document sensors S5, with the timing sensor S2 included, are aligned in a straight line along a direction perpendicular to the document conveyance direction.

Outputs of the document sensors S5 are inputted to the conveyance control section 20. The conveyance control section 20 recognizes a time point (rear-end passage time point) when the state that the presence of the cutout document 8 has been detected by the document sensors S5 and the timing sensor S2 is changed over to an undetectable state. The conveyance control section 20 determines a time difference from the first rear-end passage time point (an output change due to passage of the rear end 8a of the cutout document 8) and the last rear-end passage time point (an output change due to passage of the rearmost end 8b of the cutout document 8). When the time difference is within a predetermined permissible range, the conveyance control section 20 decides that the document has no cutout. The conveyance control section 20 recognizes, as the cutout width W1, a length resulting from multiplying the determined time difference by a predetermined document conveyance speed. The conveyance control section 20 determines, as the additional distance, the recognized cutout width W1 or a distance resulting from adding a predetermined margin to the recognized cutout width W1.

After the steps #210 and #211, the conveyance control section 20 makes the reverse-rotation motor 27a rotate reverse and the pair of reverse-rotation rollers 27 rotated reverse (step #212, similar to step #110 of FIG. 4). By these operations, the cutout document 8 is led to the third conveyance path 73, and the conveyance control section 20 feeds the cutout document 8 back onto the first conveyance path 71 (to upstream side of the pair of registration rollers 24) (step #213, similar to step #111 of FIG. 4; followed by return to step #22). From this on, the flow continues until the cutout document 8 is discharged to the document discharge tray 21a.

(Timing Adjustment Mode)

Next, a timing adjustment mode as one embodiment of document reading in the cutout document mode will be described with reference to FIGS. 11 and 12.

The timing adjustment mode is a kind of cutout document mode. The timing adjustment mode is a mode for adjusting a document reading-start timing (top-side start time, bottom-side start time) and a reading-end timing (top-side end time, bottom-side end time). The timing adjustment mode is a mode in which previously prepared, exclusive-use and equal-in-content two sheets of the cutout document 8 (adjustment document 9) are to be read. The adjustment document 9 is a kind of cutout document 8. In addition, in order to read a cutout document 8 processed by a user other than the adjustment document 9, the user may appropriately display the cutout document setting screen 44 and fulfill the settings.

The adjustment document 9 will be described with reference to FIG. 11. The adjustment document 9 is a document in which totally four black belts are drawn on a white background. Two black belts are parallel to the document conveyance direction (sub scanning direction). One of the two black belts, i.e. first black belt 91, is drawn at a location inwardly distant by a specified width W2 from the upper one of the document edge lines extending along the document conveyance direction. The other black belt, i.e. second black belt 92, is drawn at a location inwardly distant by the specified width W2 from the lower one of the edge lines of the adjustment document 9.

Another two black belts are parallel to a direction (main scanning direction) perpendicular to the document conveyance direction. One of the two black belts, i.e. third black belt 93, is drawn at a location inwardly distant by the specified width W2 from a front-side (a side on which no cutout portion 81 is present) one of edge lines of the adjustment document 9 perpendicular to the document conveyance direction. The other black belt, i.e. fourth black belt 94, is drawn at a location inwardly distant by the specified width W2 from the rear-side (a side on which the cutout portion 81 is present) one of the edge lines of the adjustment document 9 perpendicular to the document conveyance direction. The individual black belts perpendicularly intersect with one another. Those black belts are drawn on one-side surface of the adjustment document 9 while the other-side surface is a blank sheet. The specified width W2 is determined as required. In this embodiment, the specified width W2 is predetermined so as to be a length within a range of 3 mm to several cm (e.g., 5 mm). One end portion of the adjustment document 9 in the document conveyance direction is cut off. As shown in FIG. 11, the cutout width W1 of the adjustment document 9 is equal to the specified width W2. That is, the cutout width W1 of the adjustment document 9 to be read in the timing adjustment mode is predetermined. The conveyance control section 20 recognizes a predetermined width as the cutout width W1.

The main control section 5 recognizes that a specified operation for selecting the timing adjustment mode has been performed on the operation panel 4. The main control section 5 instructs the conveyance control section 20 and the reading control section 30 to read in the timing adjustment mode. Adjustment by the timing adjustment mode is performed on such occasions as adjustment prior to factory shipping or maintenance by serviceman.

Next, the flow of document conveyance and reading in the timing adjustment mode will be described with reference to FIG. 12. In FIG. 12, upper-side diagrams are for explaining the conveyance and reading of the first-sheet adjustment document 9. In FIG. 12, lower-side diagrams are for explaining the conveyance and reading of the second-sheet adjustment document 9.

In the timing adjustment mode, it is predetermined that the first sheet of the adjustment document 9 is set on the document tray 21 in such a way that the side (surface) on which the black belts are drawn is positioned on the upside and the cutout portion 81 is positioned on the rear side (upstream side) of the document (see the left upper diagram of FIG. 12). It is also predetermined that the second sheet of the adjustment document 9 is set on the document tray 21 in such a way that the side (surface) on which the black belts are drawn is positioned on the underside and the cutout portion 81 is positioned on the front side (downstream side in the document conveyance direction) of the document (see the left lower diagram of FIG. 12).

The flow of conveyance and reading of the first-sheet adjustment document 9 will be described with reference to upper-side diagrams of FIG. 12. Out of the two sheets of the adjustment document 9, the first sheet of the adjustment document 9 is for defining the top-side start time and the top-side end time.

When a reading start in the timing adjustment mode is accepted by the operation panel 4, the flow of FIG. 8 is started. Then, the conveyance control section 20 starts feed and conveyance of the first-sheet adjustment document 9 (corresponding to step #23 of FIG. 8). By the conveyance of the adjustment document 9, the conveyance control section 20 recognizes a front-end arrival of the adjustment document 9 based on an output of the timing sensor S2 (corresponding to step #24 of FIG. 8). The conveyance control section 20 notifies the reading control section 30 of the recognition. The reading control section 30 also recognizes the front-end arrival (front-end arrival time point) of the adjustment document 9 to the installation position of the timing sensor S2. In addition, the output of the timing sensor S2 may be inputted to the reading control section 30.

The reading control section 30 starts reading at a time point when a first waiting time has elapsed since the front-end arrival time point of the adjustment document 9 to the timing sensor S2. The first waiting time is set to a time duration resulting from dividing the distance from the installation position of the timing sensor S2 to the position of the reading line by the specification-base conveyance speed (ideal conveyance speed). The first waiting time is a time duration that allows reading to be started just with the document front end on condition that the document is conveyed at the ideal conveyance speed.

The document conveyance being continued, the timing sensor S2 detects passage of the adjustment document 9. The conveyance control section 20, based on an output of the timing sensor S2, recognizes a rear-end passage of the adjustment document 9 (corresponding to step #28 of FIG. 8). Because the cutout portion 81 is located at the rear end, the rear-end passage is detected earlier by an extent of the specified width W2 than the rearmost end of the adjustment document. This recognition is delivered to the reading control section 30, and the reading control section 30 also recognizes the rear-end passage of the document from the installation position of the timing sensor S2 (recognition of the rear-end passage time point).

Then, the reading control section 30 ends the reading at a time point when a time resulting from adding an additional reading time to the second waiting time has elapsed since the time point of recognition of the rear-end passage. The second waiting time is set to a time duration resulting from dividing the distance from the installation position of the timing sensor S2 to the position of the reading line by the specification-base conveyance speed. The additional reading time may be set to a time duration resulting from dividing the specified width W2 by the specification-base conveyance speed. Because the rear-end passage is detected earlier by an extent of the specified width W2 due to the cutout, the additional reading time is added so that the rear-end side from the fourth black belt 94 closer to the cutout can be read.

The reading control section 30 checks a length of front-side protrusive black belts 95, which are portions of the first black belt 91 and the second black belt 92 protruding from the third black belt 93 toward the document front end, out of image data acquired by the top-side reading of the first-sheet adjustment document 9. More specifically, the reading control section 30 determines a number of dots (real dot count) in the front-to-rear direction of the document from the front-side end to an upper-right or lower-right corner point of an overlapping portion between the first black belt 91 and third black belt 93. Also, the reading control section 30 determines a number of dots (real dot count) in the front-to-rear direction of the document from the front-side end to an upper-right or lower-right corner point of an overlapping portion between the second black belt 92 and the third black belt 93. Then, the reading control section 30 determines average value of the determined numbers of dots. Then, the reading control section 30 determines a first dot difference by subtracting the resulting average value from a number of dots (ideal dot count) corresponding to the specified width W2 (cutout width W1).

When the first dot difference (ideal dot count−average value)>0, each front-side protrusive black belt 95 is shorter than the specified width W2, proving that the reading-start timing is later. That is, the reading is started later than when the document front end passes through the reading line. Therefore, in order that the reading is started earlier by an extent corresponding to the dot count (line count) of the first dot difference, the reading control section 30 sets, as a new top-side start time, a time duration resulting from subtracting (first dot difference×reading time per line) from the first waiting time. It is noted that the reading time per line is predetermined pursuant to specifications of the image sensor 37.

When the first dot difference (ideal dot count−average value)<0, it proves that the reading-start timing is earlier. That is, the reading is started earlier than when the document front end arrives at the reading line. In this connection, with no document present, the white guide plate is read. Accordingly, in this case, in the image data of the adjustment document 9, white dots are added (inserted) further frontward of the front-side protrusive black belts 95. Therefore, in order that the reading is started later by an extent corresponding to the absolute value of the first dot difference (dot count), the reading control section 30 sets, as a new top-side start time, a time duration resulting from adding (first dot difference×reading time per line) to the first waiting time.

In addition, when the first dot difference (ideal dot count−average value)=0, the reading control section 30 sets the first waiting time as a new top-side start time.

Figure 11:
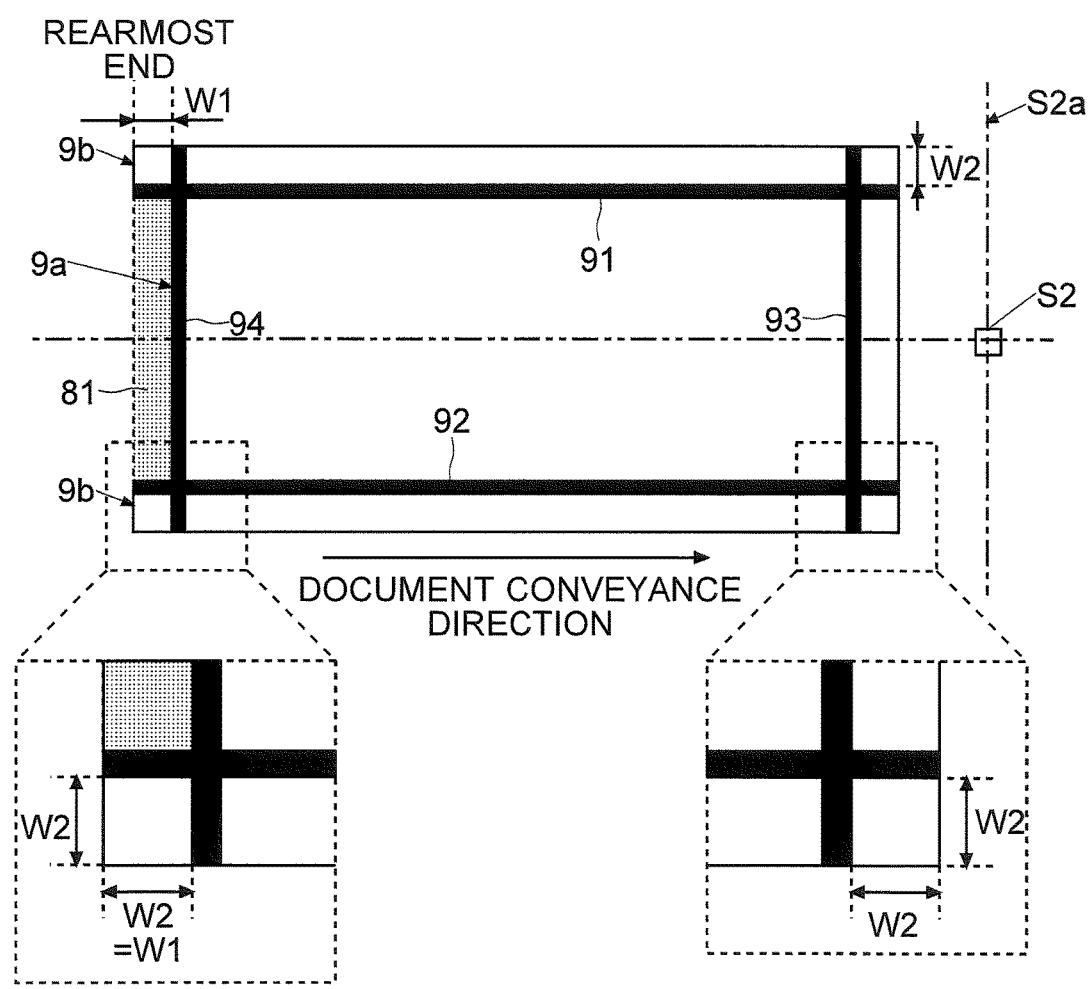
FIG. 11 is a view showing an example of an adjustment document according to the embodiment.

In another aspect, on account of the cutout, a passage of a rear end 9a (see FIG. 11) of the cutout portion 81 of the adjustment document 9 is detected before a rearmost end 9b (see FIG. 11) of the adjustment document 9 passes through the installation position (installation line; the line S2a passing through the installation position of the timing sensor S2 and extending along a direction perpendicular to the conveyance direction of the adjustment document 9, the line S2a being indicated by one-dot chain line in FIG. 11) of the timing sensor S2. However, since the additional reading time has been added, image data acquired by the top-side reading of the first-sheet adjustment document 9 include the first black belt 91 and the second black belt 92 (rear-side protrusive black belts 96) protruding from the rear-side (cutout-side) fourth black belt 94 toward the document rear end.

The reading control section 30 checks a length of the rear-side protrusive black belts 96 in the image data of the adjustment document 9. More concretely, the reading control section 30 determines a number of dots (real dot count) in a front-to-rear direction of the document from the rear-side end to an upper-left corner or lower-left corner point of the overlapping portion between the first black belt 91 and the fourth black belt 94. Also, the reading control section 30 determines a number of dots (real dot count) in the front-to-rear direction of the document from the rear-side end to an upper-left or lower-left corner point of the overlapping portion between the second black belt 92 and the fourth black belt 94. Then, the reading control section 30 determines an average value of the resulting dot counts. Then, the reading control section 30 determines a second dot difference by subtracting the resulting average value from the number of dots (ideal dot count) corresponding to the specified width W2.

When the second dot difference (ideal dot count−average value)=0, an image of an ideal width (specified width W2, cutout width W1) has been read during the period of the additional reading time. That is, the rear end 9a of the cutout portion 81 of the adjustment document 9 passes through the reading line just at a time point when the second waiting time has elapsed since the rear-end passage time point, and thereafter, the rearmost end 9b of the adjustment document 9 passes through the reading line at a time point when a sum of second waiting time+additional reading time has elapsed. That is, an image of the ideal width (specified width W2, cutout width W1) is read. Thus, in this case, the reading control section 30 sets the second waiting time as a new top-side end time.

When the second dot difference (ideal dot count−average value)>0, it can be deduced that there is insufficiency in the length of the rear-side protrusive black belts 96 to be read during the additional reading time. That is, the second waiting time is shorter (the reading end is earlier), such that the second waiting time ends before the rear end 9a of the cutout portion 81 of the adjustment document 9 passes through the reading line, and that the rearmost end 9b of the adjustment document 9 has not yet passed through the reading line at a time point when the sum of the second waiting time+additional reading time has elapsed. Therefore, in order that the reading end becomes later by an extent corresponding to the number of dots (dot count) of the second dot difference, the reading control section 30 sets, as a new top-side end time, a time resulting from adding the (second dot difference×reading time per line) to the second waiting time.

When the second dot difference (ideal dot count−average value)<0, the reading area results in a sum of individual rear-side protrusive black belts 96 to be read during the additional reading time+excess area. With no document present, the white guide plate is read. Accordingly, in this case, in the image data of the adjustment document 9, white dots are added further rearward of the rear-side protrusive black belts 96. That is, the second waiting time is longer (the reading end is later), such that the second waiting time ends after the rear end 9a of the cutout portion 81 of the adjustment document 9 passes through the reading line, and that the rearmost end 9b of the adjustment document 9 passes through the reading line before the sum of second waiting time+additional reading time has elapsed. Therefore, in order that the reading end becomes earlier by an extent corresponding to the number of dots (dot count) of the second dot difference, the reading control section 30 sets, as a new top-side end, a time duration resulting from subtracting (second dot difference×reading time per line) from the second waiting time.

The first-sheet adjustment document 9, after the top-side reading, is led to the pair of reverse-rotation rollers 27. In this process, the cutout portion 81 is positioned on the rear side. Therefore, the conveyance control section 20 performs stop and reverse-rotation start of the pair of reverse-rotation rollers 27 at a time point when the document has been conveyed to a sum of reference distance+additional distance since the rear-end passage time point (corresponding to step #211 of FIG. 8). By the switchback operation, the first-sheet adjustment document 9 is reversed between top and bottom with the cutout portion 81 positioned on the front side and conveyed as it is (see the upper-middle diagram in FIG. 12). From this on, reading of the first-sheet adjustment document 9 is unnecessary until the document is discharged.

In order that the first-sheet adjustment document 9 is discharged in the same top-and-bottom relation as in the setting on the document tray 21, the conveyance control section 20 leads the first-sheet adjustment document 9 again to the pair of reverse-rotation rollers 27. In this process, the cutout portion 81 is positioned on the front side. Therefore, the conveyance control section 20 performs stop and reverse-rotation start of the pair of reverse-rotation rollers 27 at a time point when the document has been conveyed by the reference distance since the rear-end passage time point (corresponding to step #210 of FIG. 8). After the second-time switchback, the first-sheet adjustment document 9, passing through the timing sensor S2, is discharged to the document discharge tray 21a (see the upper-right diagram in FIG. 12).

After the discharge of the first-sheet adjustment document 9, the conveyance control section 20 starts feed and conveyance of the second-sheet adjustment document 9 (corresponding to step #23 in FIG. 8; see lower-left diagram in FIG. 12). Since the second-sheet adjustment document 9 is set with its cutout portion 81 positioned on the front side and with its black belt-drawn side positioned on the lower side, reading during the first time passing through the reading line is unnecessary.

The conveyance control section 20 leads the second-sheet adjustment document 9 to the pair of reverse-rotation rollers 27. In this process, the cutout portion 81 is positioned on the front side. Therefore, the conveyance control section 20 performs stop and reverse-rotation start of the pair of reverse-rotation rollers 27 at a time point when the document has been conveyed by the reference distance since the rear-end passage time point (corresponding to step #210 of FIG. 8). By the first-time switchback, the second-sheet adjustment document 9 is brought into such a state that the cutout portion 81 is positioned on the rear side and that the conveyed-sheet reading use contact glass 31a and the black belt-drawn side face each other (see the lower-middle diagram in FIG. 12).

As with the first sheet, the reading control section 30 starts the reading at a time point when the first waiting time has elapsed since the time point when the timing sensor S2 has recognized an front-end arrival of the adjustment document 9 (front-end arrival time point). Also, the reading control section 30 ends the reading at a time point when a time duration resulting from adding an additional reading time to the second waiting time has elapsed since the timing sensor S2 has recognized the passage of the rear end 9a of the adjustment document 9 (rear-end passage time point). Then, as with the first-sheet adjustment document 9, the reading control section 30 checks the length of the front-side protrusive black belts 95 in the image data acquired by the reading of the second-sheet adjustment document 9, determines the first dot difference, and sets the bottom-side start time. Further, as with the first-sheet adjustment document 9, the reading control section 30 checks the length of the rear-side protrusive black belts 96 in the image data acquired by the reading of the second-sheet adjustment document 9, determines the second dot difference, and sets the bottom-side end time.

As described above, the reading device 1 according to the embodiment includes an operation panel 4, a reading unit 3, and a conveyance unit 2. The operation panel 4 accepts settings. The reading unit 3 reads a document that passes through the reading device 1. The conveyance unit 2 includes: a sheet feed roller 22 for feeding out a document set on a document tray 21; a first conveyance path 71 ranging from the sheet feed roller 22 to a reading position; a detection part (timing sensor S2) provided on the first conveyance path 71 and serving for detecting whether or not the document is present; a pair of reverse-rotation rollers 27 which rotate forward while nipping the document and then stop in a state discharging a part of the document to outside, and thereafter rotate reverse; a second conveyance path 72 ranging from the reading position to the pair of reverse-rotation rollers 27; a third conveyance path 73 which has one end connected to the first conveyance path 71 and another end connected to the second conveyance path 72 and which allows the switched-back document to pass therethrough and be fed back to upstream side of the reading position; and a conveyance control section 20 for controlling document conveyance. The pair of reverse-rotation rollers 27 rotate reverse to feed the document onto the third conveyance path 73. The operation panel 4 accepts double-sided reading of the document, and application of a cutout document mode for reading a cutout document 8 which has a cutout part at its rear end in a document conveyance direction, the cutout part passing through a detection area of the detection part (timing sensor S2). In a case of double-sided reading of the document and with the cutout document mode unapplied, the conveyance control section 20 stops the pair of reverse-rotation rollers 27 at a time point when the document has been conveyed by a predetermined reference distance since a rear-end passage time point that is a time point when the detection part (timing sensor S2) having so far been detecting a document presence has detected a document absence, and thereafter the conveyance control section 20 starts reverse rotation of the pair of reverse-rotation rollers 27. In a case of the double-sided reading of the document and with the cutout document mode applied, the conveyance control section 20 stops the pair of reverse-rotation rollers 27 at a time point when the document has been conveyed by a distance resulting from adding an additional distance, which is predetermined or determined based on a recognized cutout width W1 in the document conveyance direction, to the reference distance since the rear-end passage time point, and thereafter the conveyance control section 20 starts reverse rotation of the pair of reverse-rotation rollers 27.

As a result of this, even though the rear-end passage is detected earlier than a time point that should be detected (a time point of passage of the rearmost end 8b, 9b) because of overlapping between the cutout portion 81 and the detection area of the detection part, the pair of reverse-rotation rollers 27 start switchback operation after the document rearmost end 8b, 9b has passed through the branch point. Therefore, even when the cutout document 8 is switched back, the cutout document 8 and the adjustment document 9 can be prevented from damage and jam. Thus, there can be provided an easy-to-use reading device 1. In this connection, the reference distance refers to a distance which is determined based on a distance from the installation position of the detection part to the branch position 75 between the second conveyance path 72 and the third conveyance path 73 in order that the switched-back document is fed onto the third conveyance path 73.

Also in the case of the double-sided reading of the document and with the cutout document mode applied, the conveyance control section 20, in a state that the cutout portion 81 of the cutout document 8 is positioned on the rear side of the document, stops the pair of reverse-rotation rollers 27 at a time point when the document has been conveyed by a distance resulting from adding the additional distance to the reference distance since the rear-end passage time point. Thereafter, the conveyance control section 20 starts reverse rotation of the pair of reverse-rotation rollers 27. With the cutout portion 81 of the cutout document 8 positioned on the document front side, the conveyance control section 20 stops the pair of reverse-rotation rollers 27 at a time point when the document has been conveyed by the reference distance since the rear-end passage time point, and thereafter starts reverse rotation of the pair of reverse-rotation rollers 27.

As a result of this, with the cutout positioned on the front side of the document conveyance direction, since the detection part (timing sensor S2) detects the rear-end passage upon passage of the rearmost end of the document, there is no need for adding the additional distance. Meanwhile, with the cutout positioned on the rear side of the document conveyance direction, since the detection part detects the rear-end passage upon passage of the rear end 8a, 9a of the cutout portion 81 of the document, there is a need for adding the additional distance. Therefore, the document conveyance distance from the rear-end passage time point to the switchback-operation start can be lengthened only when necessary. Thus, the document conveyance can be fulfilled properly during the reading of the cutout document 8.

The reading device 1 also includes: a discharge conveyance path 74 connected to a midpoint of the second conveyance path 72 and a discharge port 28; and a movable guide plate 29 which can be moved to guide the document to the pair of reverse-rotation rollers 27 or to the discharge port 28. The conveyance control section 20 makes the pair of reverse-rotation rollers 27 switch back the document two times, and moves the movable guide plate 29 so as to guide the document to the pair of reverse-rotation rollers 27 until two-time switchbacks are executed. After the two-time switchbacks are executed, the conveyance control section 20 moves the movable guide plate 29 so as to guide the document to the discharge port 28. Thus, the cutout document 8 can be discharged as it is in the same top-and-bottom position as the set document. Even though the cutout document 8 is switched back a plural number of times, the cutout document 8 can be prevented from occurrence of jam and damage.

Also, the operation panel 4 accepts an input of the cutout width W1. The conveyance control section 20 recognizes an input cutout width W1 and defines, as the additional distance, the recognized cutout width W1 or a length resulting from adding a predetermined margin to the recognized cutout width W1. As a result of this, it is implementable to make the pair of reverse-rotation rollers 27 execute switchback operation at a proper timing after the rearmost end of the cutout document 8 has passed the branch point between the second conveyance path 72 and the third conveyance path 73 and moreover before the document completely passes through the pair of reverse-rotation rollers 27.

On the way of the first conveyance path 71, a plurality of document sensors S5 for detecting whether or not the document is present may be provided at different positions in the main scanning direction. The conveyance control section 20 recognizes the cutout width W1 by multiplying a time difference between the individual document sensors S5 in terms of a time duration from a document presence-detectable state to a document presence-undetectable state, by a predetermined document conveyance speed, and then the conveyance control section 20 defines, as the additional distance, the recognized cutout width W1 or a distance resulting from adding a predetermined margin to the recognized cutout width W1. As a result of this, it is implementable to make the pair of reverse-rotation rollers 27 execute switchback operation at a proper timing after the rearmost end of the cutout document 8 has passed the branch point between the second conveyance path 72 and the third conveyance path 73 and moreover before the document completely passes through the pair of reverse-rotation rollers 27. Still, the cutout width W1 is recognized automatically, so that time and labor for input of the cutout width W1 by the user can be saved.

The cutout document mode includes a timing adjustment mode for reading the adjustment document 9 for adjusting the document reading-start timing and reading-end timing, where the document is the cutout document 8. The reading unit 3 includes: a lamp 38 for illuminating the document passing through the reading position with light; an image sensor 37 for reading the document; and a reading control section 30 for controlling operations of the lamp 38 and the image sensor 37. In the timing adjustment mode, the reading control section 30 adjusts the reading-start timing and the reading-end timing for the document based on a reading result of the adjustment document 9. As a result of this, adjustment for achieving correct reading of documents with use of the adjustment document 9 can be fulfilled. Still, the adjustment document 9 is less likely to be damaged, so that one-sheet adjustment document 9 can repeatedly be used over and over.

Also, the image forming apparatus (multifunction peripheral 100) includes the above-described reading device 1. Thus, there can be provided an image forming apparatus which is free from damage or paper jam of the cutout document 8 during the course of switchback of the cutout document 8 and which allows document reading to be easily executed.

What is claimed is:

1. A reading device comprising:
an operation panel for accepting a setting;
a reading unit for reading a document that passes through a reading position; and
a conveyance unit including: a sheet feed roller for feeding out a document set on a document tray; a first conveyance path ranging from the sheet feed roller to the reading position; a detection part provided on the first conveyance path and serving for detecting whether or not the document is present; a pair of reverse-rotation rollers which rotate forward while nipping the document and then stop in a state discharging a part of the document to outside, and thereafter rotate reverse; a second conveyance path ranging from the reading position to the pair of reverse-rotation rollers; a third conveyance path which has one end connected to the first conveyance path and another end connected to the second conveyance path and which allows the switched-back document to pass therethrough and be fed back to upstream side of the reading position; and a conveyance control section for controlling document conveyance, wherein
the pair of reverse-rotation rollers rotate reverse to feed the document onto the third conveyance path,
the operation panel accepts double-sided reading of the document, and application of a cutout document mode for reading a cutout document which has a cutout part at its rear end in a document conveyance direction, the cutout part passing through a detection area of the detection part,
in a case of double-sided reading of the document,
with the cutout document mode unapplied,
the conveyance control section stops the pair of reverse-rotation rollers at a time point when the document has been conveyed by a predetermined reference distance since a rear-end passage time point that is a time point when the detection part having so far been detecting a document presence has detected a document absence, and thereafter the conveyance control section starts reverse rotation of the pair of reverse-rotation rollers,
with the cutout document mode applied,
the conveyance control section stops the pair of reverse-rotation rollers at a time point when the document has been conveyed by a distance resulting from adding an additional distance, which is predetermined or determined based on a recognized cutout width in the document conveyance direction, to the reference distance since the rear-end passage time point, and thereafter the conveyance control section starts reverse rotation of the pair of reverse-rotation rollers.

2. The reading device according to claim 1, wherein
in a case of double-sided reading of the document and with the cutout document mode applied,
the conveyance control section, in a state that a cutout portion of the cutout document is positioned on a rear side of the document, stops the pair of reverse-rotation rollers at a time point when the document has been conveyed by a distance resulting from adding the additional distance to the reference distance since the rear-end passage time point, and thereafter the conveyance control section starts reverse rotation of the pair of reverse-rotation rollers, and with the cutout portion of the cutout document positioned on the front side of the document, the conveyance control section stops the pair of reverse-rotation rollers at a time point when the document has been conveyed by the reference distance since the rear-end passage time point, and thereafter starts reverse rotation of the pair of reverse-rotation rollers.

3. The reading device according to claim 2, further comprising:
a discharge conveyance path connected to a midpoint of the second conveyance path and a discharge port; and
a movable guide plate which can be moved to guide the document to the pair of reverse-rotation rollers or to the discharge port, wherein
the conveyance control section makes the pair of reverse-rotation rollers switch back the document two times, and moves the movable guide plate so as to guide the document to the pair of reverse-rotation rollers until two-time switchbacks are executed, and after the two-time switchbacks are executed, the conveyance control section moves the movable guide plate so as to guide the document to the discharge port.

4. The reading device according to claim 1, wherein
the operation panel accepts an input of the cutout width,
the conveyance control section recognizes an input cutout width and defines, as the additional distance, the recognized cutout width or a distance resulting from adding a predetermined margin to the recognized cutout width.

5. The reading device according to claim 1, wherein
on a way of the first conveyance path, a plurality of document sensors for detecting whether or not a document is present are provided at different positions in a main scanning direction, and
the conveyance control section recognizes the cutout width by multiplying a time difference between the individual document sensors in terms of a time duration from a document presence-detectable state to a document presence-undetectable state, by a predetermined document conveyance speed, and then the conveyance control section defines, as the additional distance, the recognized cutout width or a distance resulting from adding a predetermined margin to the recognized cutout width.

6. The reading device according to claim 1, wherein
the cutout document mode includes a timing adjustment mode for reading an adjustment document for adjusting a document reading-start timing and reading-end timing, where the document is the cutout document,
the reading unit includes: a lamp for illuminating the document passing through the reading position with light; an image sensor for reading the document; and a reading control section for controlling operations of the lamp and the image sensor, and
in the timing adjustment mode,
the reading control section adjusts the reading-start timing and the reading-end timing for the document based on a reading result of the adjustment document.

7. The reading device according to claim 6, wherein
the adjustment document has a one-side surface with a plurality of black belts drawn thereon and the other side being a blank sheet, the timing adjustment mode is a mode for reading two of the adjustment documents, and wherein the reading control section adjusts a top-side start time which is a time duration from a time point of a first front-end arrival detection by the detection part in double-sided reading to a start of top-side reading, and a top-side end time which is a time duration from a time point of a first document rear-end passage detection by the detection part to an end of the top-side reading, based on image data acquired by reading of the top side with the black belts drawn thereon out of the first-sheet adjustment document that is set on the document tray so that a black belt-drawn side of the document is positioned on upside and that a cutout portion is positioned on a rear side of the document, and adjusts a bottom-side start time which is a time duration from a time point of a second document front-end arrival detection by the detection part in double-sided reading to a start of bottom-side reading, and a bottom-side end time which is a time duration from a time point of a second document rear-end passage detection by the detection part to an end of the bottom-side reading, based on image data acquired by reading of the bottom side with the black belts drawn thereon out of the second-sheet adjustment document that is set on the document tray so that a black belt-drawn side of the document is positioned on underside and that a cutout portion is positioned on a front side of the document.

8. An image forming apparatus including the reading device as defined in claim 1.

9. A reading device control method comprising the steps of:

reading a document that passes through a reading position;

making a sheet feed roller feed out a document set on a document tray;

providing, as a first conveyance path, a conveyance path ranging from the sheet feed roller to the reading position;

providing a detection part on the first conveyance path to detect whether or not the document is present;

making a pair of reverse-rotation rollers rotate forward while nipping the document and then stop in a state discharging a part of the document to outside, stopped in this state, and thereafter rotate reverse;

providing, as a second conveyance path, a conveyance path ranging from the reading position to the pair of reverse-rotation rollers;

providing, as a third conveyance path, a conveyance path which has one end connected to the first conveyance path and another end connected to the second conveyance path and which allows the switched-back document to pass therethrough and be fed back to upstream side of the reading position; and feeding the document onto the third conveyance path under a condition that the pair of reverse-rotation rollers are rotating reverse;

accepting double-sided reading of the document, and application of a cutout document mode for reading a cutout document which has a cutout part at its rear end in a document conveyance direction, the cutout part passing through a detection area of the detection part;

in a case of double-sided reading of the document and with the cutout document mode unapplied, making the pair of reverse-rotation rollers stop at a time point when the document has been conveyed by a predetermined reference distance since a rear-end passage time point that is a time point when the detection part having so far been detecting a document presence has detected a document absence, and thereafter starting the reverse rotation of the pair of reverse-rotation rollers; and in a case of double-sided reading of the document and with the cutout document mode applied, making the pair of reverse-rotation rollers stop at a time point when the document has been conveyed by a distance resulting from adding an additional distance, which is predetermined or determined based on a recognized cutout width in the document conveyance direction, to the reference distance since the rear-end passage time point, and thereafter starting the reverse rotation of the pair of reverse-rotation rollers.

* * * * *